(12) United States Patent
Watanabe et al.

(10) Patent No.: US 6,791,510 B2
(45) Date of Patent: Sep. 14, 2004

(54) INFLATABLE STRUCTURE, ARRAY ANTENNA WITH INFLATABLE STRUCTURE, AND DEPLOYMENT METHOD FOR INFLATABLE STRUCTURE

(75) Inventors: Akihito Watanabe, Sakai-gun (JP); Hiroaki Tsunoda, Tokyo (JP); Yumi Senbokuya, Tokyo (JP)

(73) Assignees: Sakase Adtech Co., Ltd., Fukui (JP); Nippon Telegraph and Telephone Corporation, Tokyo (JP)

( * ) Notice: Subject to any disclaimer, the term of this patent is extended or adjusted under 35 U.S.C. 154(b) by 49 days.

(21) Appl. No.: 10/169,554
(22) PCT Filed: Nov. 2, 2001
(86) PCT No.: PCT/JP01/09643
§ 371 (c)(1),
(2), (4) Date: Jul. 8, 2002
(87) PCT Pub. No.: WO02/36429
PCT Pub. Date: May 10, 2002

(65) Prior Publication Data
US 2003/0016186 A1 Jan. 23, 2003

(30) Foreign Application Priority Data
Nov. 6, 2000 (JP) ......................... 2000-342368
Aug. 28, 2001 (JP) ......................... 2001-258480

(51) Int. Cl.$^7$ .................................................. H01Q 1/36
(52) U.S. Cl. ...................... 343/897; 343/912; 343/915
(58) Field of Search ................................. 343/897, 706, 343/912, 915

(56) References Cited

U.S. PATENT DOCUMENTS

| | | | | |
|---|---|---|---|---|
| 3,974,989 A | * | 8/1976 | Goodfellow | 244/126 |
| 6,154,185 A | * | 11/2000 | Watanabe | 343/897 |
| 6,291,738 B1 | * | 9/2001 | Uchino et al. | 602/42 |

\* cited by examiner

Primary Examiner—Hoang V. Nguyen
(74) Attorney, Agent, or Firm—Morrison & Foerster LLP

(57) ABSTRACT

In an inflatable structure provided with an array antenna or the like, a membrane of a multi-layer inflatable structure is provided with an airtight layer for forming an airtight space inside and a rigidizing layer provided outside the airtight layer, and the rigidizing layer is composed of a triaxial woven fabrics of reinforcing fibers, to thereby achieve a light mass and a high level of precision, and enable adaptation to a demand for increased size.

14 Claims, 13 Drawing Sheets

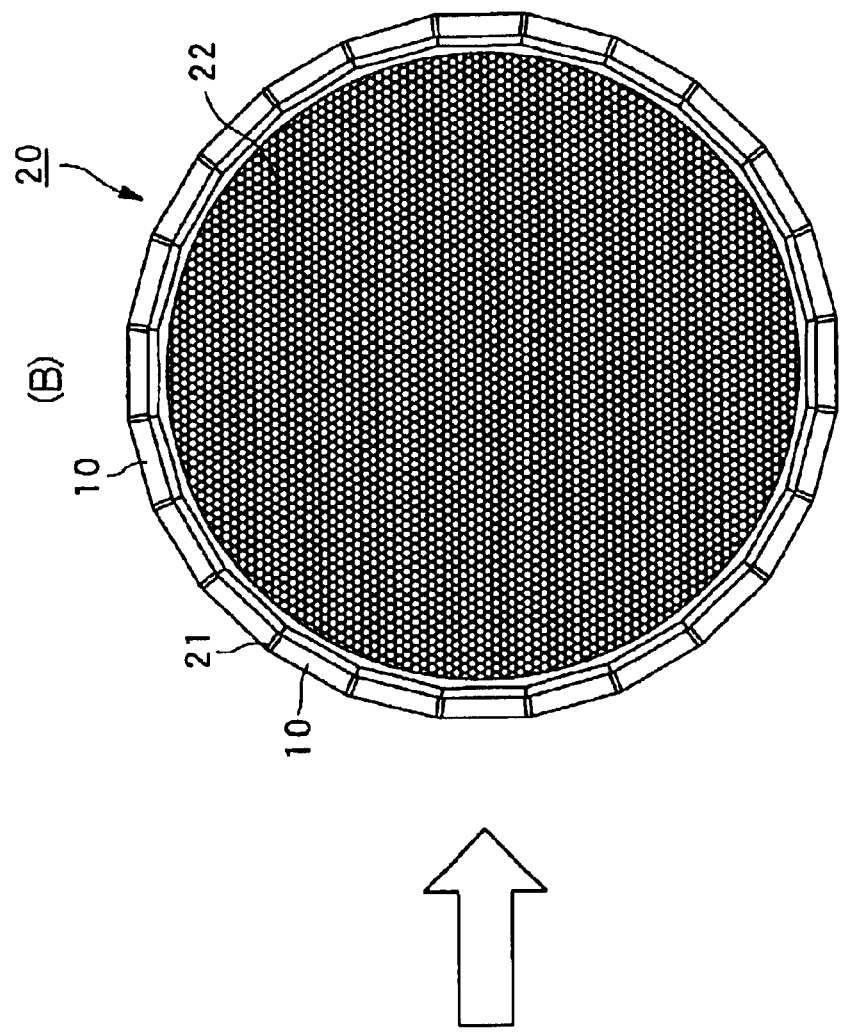
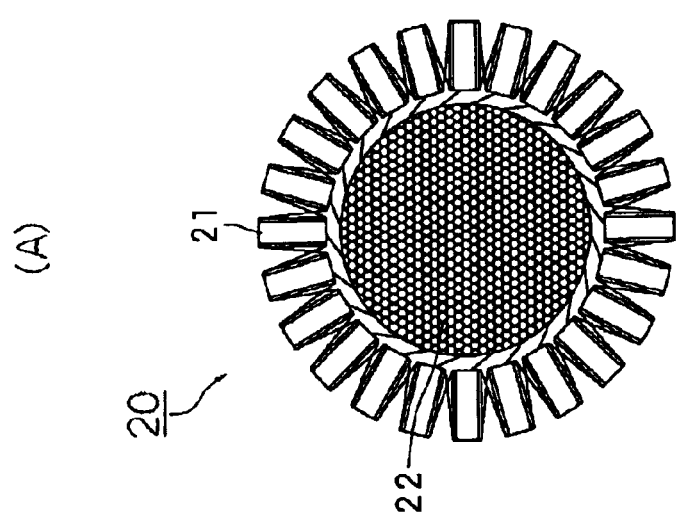
FIG. 3

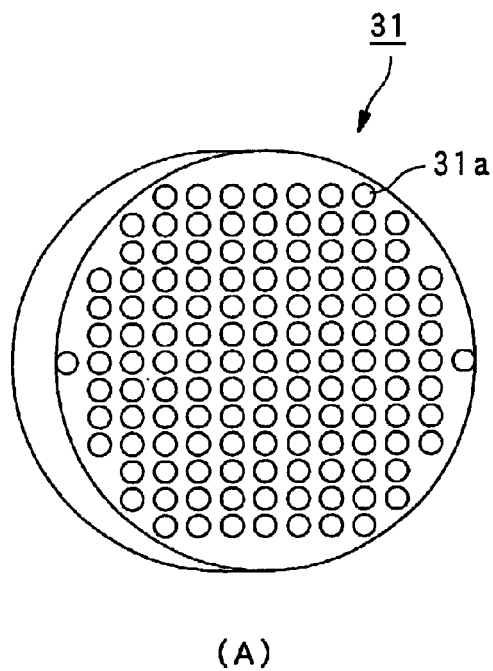
(A)
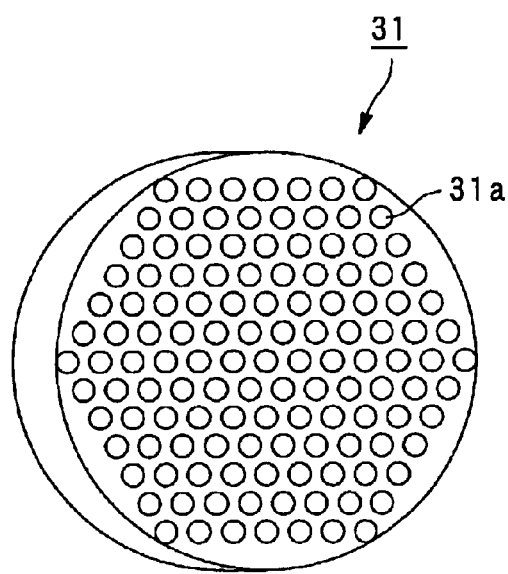
(B)
FIG. 5

INFLATABLE STRUCTURE, ARRAY ANTENNA WITH INFLATABLE STRUCTURE, AND DEPLOYMENT METHOD FOR INFLATABLE STRUCTURE

TECHNICAL FIELD

The present invention relates to an inflatable structure for supporting and reinforcing an object arranged in outer space, an array antenna with the inflatable structure, and a method of deploying the inflatable structure.

BACKGROUND ART

An object of an inflatable structure is to support and reinforce an object (for example, an antenna or the like) arranged in outer space. Such an inflatable structure has been researched and developed in recent years, and has been put to practical use.

An inflatable structure is formed by a sealed, bag-shape member. When the bag-shape member is folded up, a gas or the like is filled into an internal portion thereof, whereby internal pressure thus generated causes the member to reassume a tube shape, a balloon shape or other such desired shape.

In a case where the inflatable structure is of the tube shape, there are instances where the structure itself may serve as a prop or as a truss structure or other such unit member. Further, the inflatable structure can also be constructed as a square ring or as an annular ring tube, which extends in tension a membrane surface having an antenna element mounted on its inner side, to thereby support the antenna.

On the other hand, in a case where the inflatable structure is a balloon shape, the structure can also function as a part of a reflective mirror antenna, where the structure itself serves as a reflective surface.

A specific example of this type of inflatable structure will now be explained with reference to FIG. 17. FIG. 17 is a perspective view showing an antenna arranged in outer space, in a state supported by the inflatable structure.

As shown in FIG. 17, an antenna 100 is basically composed of an inflatable structure 101, a plane antenna 102 supported by the inflatable structure 101, and a plurality of tensioning cables 103 for supporting the plane antenna 102 with the inflatable structure 101.

The plane antenna 102 is composed of a disc-shape membrane surface with an antenna element mounted onto it. The inflatable structure 101 is a ring tube shape and is arranged surrounding the plane antenna 102.

Further, when the inflatable structure 101 is extended in tension, the plane antenna 102 is tensioned and extended by means of the tensioning cables 103. Accordingly, by being pulled in each different direction along the plane surface, the plane antenna 102 is supported by the inflatable structure 101 such that it maintains its surface geometry.

In a case where a reflective mirror is to be reproduced instead of the above-mentioned flat surface structure, a lens-type reflective mirror that is extended in tension in the interior space is also constructed using the inflatable structure.

A procedure for arranging the above-mentioned antenna 100 in outer space, such as in a satellite orbit, will now be explained.

First, the plane antenna 102 and the inflatable structure 101 are both stored inside a rocket fairing in their rolled or folded states.

Then the rocket is launched, and the antenna 100 is set on its satellite orbit. In this state, a gas or a urethane foam is filled into the inflatable structure 101 to deploy (restore) the inflatable structure 101 to its ring tube shape.

In this way, the plane antenna 102 which is in the rolled or folded state is extended, and the tensioning cables 103 pull uniformly on the membrane surface periphery of the plane antenna 102, to extend it into a flat plane without distortions.

Even when the inflatable structure described above is used with a large-scale structure to be arranged in out space, such as the antenna, the structure can be folded for example, so that the volume thereof can be reduced when it is launched using the rocket.

The above-mentioned structural characteristics are effective for putting equipment into satellite orbits when the mass (payload) that can be launched and the storage capacity of the fairing of the rocket are limited. Further, the characteristics are also effective for reducing the mass of each structure constituting an artificial satellite that will be put into satellite orbit and for reducing the cost of launching. Therefore, use of inflatable structures is being studied for a wide range of applications as a suitable structure for an antenna mounted on a satellite.

Demand to increase the size of structures arranged in outer space such as in satellite orbit has risen in recent years as space development has progressed.

For example, although the above-mentioned antenna has typically been a relatively small-scale antenna directly fixed and mounted on a low-orbit satellite, there is a demand to expand the diameter across its opening in order to increase its area gain so that it can be used as an antenna that is mounted onto a satellite that is in a stationary satellite orbit.

Further, its used is being studied for many applications, such as for high-speed data communications, radio wave observation satellites, synthetic aperture radar for remote sensing, and solar array mounting.

In order to make these applications practical, it is necessary to increase the size of the structures, including the antenna, the reflective mirror and the like. Further, regarding the antenna, there is a need to improve its area gain, side lobe level, directivity and other such electrical performance as well. Thus, a further increase in the precision level is necessary.

In order to satisfy these needs, examples of plane antennae and the like, which employ the inflatable structure, include one which is currently being developed in which the size of one side thereof exceeds 10 m. Moreover, an antenna in which the size of one side reaches several tens of meters is also being planned.

As described above, while there is a demand to increase the size of structures arranged in outer space, there is a need to reduce the mass and improve storability (compactness during storing) in light of restrictions on the payload of the launching rocket and the volume of the fairing where the structure is to be stored.

Therefore, there is a need to fulfill contradictory objects of increasing the size of the structure to be arranged in outer space and of reducing the mass of the structure and making it more compact when it is stored. Satisfying all these demands simultaneously entails technical difficulty.

In order to satisfy the demand for the reduced mass, it is necessary to employ a construction using a very strong and very elastic material, to increase the specific strength and the specific modulus of the inflatable structure.

On the other hand, when the size of the structure is increased, the overall flexibility of the structure increases, which means that even the slightest differences in the structure or in the manufacturing process result in distortions and deformations in the structure.

Further, the above-mentioned spaceborne structure must be very reliable regarding its structure and also with respect to environment. In a case where the bag-shape membrane that constitutes the inflatable structure of a tube shape is formed solely of a film, it has an advantage that it can be made lightmass and have a simple construction. However, in order to maintain the precision level of the structure, the gas pressure inside the inflatable structure must be controlled constantly.

Further, there is a danger that space debris and the like, which is also called space garbage, will cause damage to the membrane structure to cause loss of gas pressure, so that the structure cannot be maintained.

To prevent this, a curing-type resin is layered on these films, and sometimes reinforcing fibers are further layered on top of this, in order to enhance the hardness of the membrane structure. However, since these reinforcing measures increase the mass, there is a need for a structure which is both lightmass and highly reliable.

Thus, the following have been proposed as examples of structures which satisfy these various demands.

One is to increase its strength by using, as the rigidizing layer, aramid fibers or other such woven structure which is made airtight. Another example is to layer the aramid fibers or other such woven structure onto an airtight membrane to achieve a fiber-reinforced structure (FRP).

Here, the rigidizing layer for increasing strength includes several layers of reinforcing fiber weave. However, in this sort of layered structure, even though the strength and rigidity are increased, an increase in mass cannot be avoided. Further, these measures are not good for a structure which is to be folded up compactly and stored inside the fairing of the rocket.

Further, there is an inherent anisotropy in the weave of these reinforcing fiber weaves. Therefore, it is unavoidable that effects of this anisotropy will be present in the inflatable structure.

As an example of such a fiber-reinforced composite material, explanation will now be made of a typical biaxial woven fabrics of reinforcing fiber, making reference to FIG. 18. FIG. 18 is a plan view of the biaxial woven fabrics.

The biaxial woven fabrics 101a is composed of a woven structure in which reinforcing fiber bands 101y, 101x are woven together in an alternating fashion along the vertical and horizontal axes. Therefore, it possesses a structural anisotropy.

When this is used as the rigidizing layer of the inflatable structure, distortions and deformations caused by the anisotropy appear in the structure body. Particularly when the structural body is large, the influence of the anisotropy is increased due to the increased flexibility attendant on the size enlargement, and high-level precision cannot be maintained.

Thus, there are cases where it is necessary to layer the biaxial woven fabrics to eliminate the anisotropy; however, when a plurality of layers are laminated to achieve the necessary strength, the mass also increases, and thus it becomes difficult to achieve the reduction of the mass, which is the original object.

Further, as described above, during the launch it is necessary to roll or fold the structure to store it in the fairing; however, the structure having the thick, laminated layers of the reinforcing fiber weave inevitably has inferior storage properties.

On the other hand, in order to deal with these problems, when a highly elastic and very strong reinforcing fiber is used to reduce the density of the weave, the woven structure becomes loose and its rigidity suffers. Further, when the structure is rolled or folded up when stored in the fairing, misalignments occur in the woven structure, so the precision of the structure suffers and the intended precision level cannot be reproduced when the structure is deployed in outer space.

Further, when a highly elastic and very strong reinforcing fiber is used to decrease the number of layers of the biaxial woven fabrics, the anisotropy of the biaxial woven fabrics woven structure appears more evidently, which is not desirable.

An object of the present invention is to provide an inflatable structure which is lightmass and highly precise, and is adaptable to a demand for increased size.

A further object of the present invention is to provide an array antenna having an inflatable structure which is lightmass and highly precise, and is adaptable to a demand for increased size.

A further object of the present invention is to provide a method of deploying the inflatable structure with excellent reproducibility.

DISCLOSURE OF THE INVENTION

In order to achieve the above-mentioned objects, in accordance with the present invention, there is provided an inflatable structure provided with a multi-layer structure membrane comprising an airtight layer for forming an airtight space inside thereof; and a rigidizing layer formed with a triaxial woven fabrics of reinforcing fibers.

Therefore, since the rigidizing layer is formed with the triaxial woven fabrics of reinforcing fibers, it is easy to reduce the mass and improve the precision of the rigidizing layer. This is because it is not necessary to laminate layers to eliminate anisotropy since the triaxial woven fabrics exhibits a quasi-isotropy in its structure. Further, this eliminates a need to reduce the weave density.

A long shelf life prepreg resin may be used as a matrix resin in the rigidizing layer.

Here, the long shelf life prepreg resin refers to a resin which does not cure in a normal temperature environment.

Using the long shelf life prepreg resin as the matrix resin of the rigidizing layer as described above reduces a burden of managing the temperature.

The multi-layer structure membrane may have a protective layer for protecting the rigidizing layer, on an outer side of the rigidizing layer.

Accordingly, the strength can be improved further.

It is preferable that when the inflatable structure is deployed, the airtight layer exhibits a rate of deformation along its direction of deployment which is greater than a rate of deformation of the protective layer along its direction of deployment.

Accordingly, when the inflatable structure is deployed, the rigidizing layer is sandwiched between and pressured by both the airtight layer and the protective layer, so that adhesion among the layers is increased.

The protective layer is preferably provided with a gas escape hole.

Accordingly, since this enables gas that is enclosed in the rigidizing layer to escape, the adhesion between the rigidizing layer and the protective layer increases.

There are preferably provided a plurality of the multi-layer structure membranes formed in cylindrical shapes; and ring-shape rigid connecting members for linking the plurality of the multi-layer structure membranes.

Accordingly, the inflatable structure is easily formed.

When the inflatable structure is stored, the rigid connecting members preferably function as storage portions for storing the multi-layer membranes.

Accordingly, this enables the multi-layer membrane structure to be effectively protected.

The rigid connecting members are preferably constructed such that they can be connected with each other when the inflatable structure is stored.

Accordingly, this increases the rigidity during storage.

Further, in accordance with the present invention, there is provided an array antenna provided with the inflatable structure, comprising:

the above-mentioned inflatable structure;

a plurality of membrane members which are extended into a flat planar shape by deployment of the inflatable structure; and a plurality of conductive non-woven fabrics serving as radiatied element, a conductive membrane serving as a grounding surface, and a microstrip line for supplying electricity to the conductive non-woven fabrics, which are each formed onto any one of the plurality of the membrane members, characterized in that the membrane members are composed of triaxial woven fabricss.

In accordance with the present invention, since the membrane members are composed of the triaxial woven fabricss of reinforcing fibers, it is easy to reduce the mass and improve the precision of the membrane members.

It is preferable that the array antenna comprises two membrane members including a first membrane member and a second membrane member which are arranged in parallel, and in which:

the plurality of conductive non-woven fabrics are formed on a surface on an outer side of the first membrane member;

the conductive membrane is formed on a surface on an inner side of the second membrane member; and the microstrip line is formed on a surface on an outer side of the second membrane member.

Further, it is preferable that the array antenna comprises three membrane members including a first membrane member, a second membrane member and a third membrane member, each arranged in sequence and in parallel, and in which:

the plurality of conductive non-woven fabrics are formed on a surface on an outer side of the first membrane member;

the conductive membrane is formed on a surface of the second membrane member facing the first membrane member; and the microstrip line is formed on a surface on an outer side of the third membrane member.

Also, it is preferable that the array antenna comprises two membrane members including a first membrane member and a second membrane member arranged in parallel, and in which:

the plurality of conductive non-woven fabrics are formed on a surface on an outer side of the first membrane member;

the conductive membrane is formed on a surface on an inner side of the second membrane member; and the microstrip line is formed on a surface on the inner side of the first membrane member.

It is preferable that the array antenna is further provided with:

a plurality of linear members provided linked to each of the members, which extend the membrane members into flat planar shapes by pulling each of the membrane members in respectively different directions along the flat plane, during deployment of the inflatable structure;

a binding member provided slidably with respect to each pair of the plurality of linear members, which allows a degree of freedom with respect to the spacing between the linear members when the inflatable structure is not in its deployed state, while it determines the spacing between each of the linear members when the inflatable structure is in its deployed state; and a plurality of stoppers which are each fixed in predetermined positions with respect to each of the linear members and regulates the position of the binding member along its slide direction when the inflatable structure is in its deployed state, to thereby determine the relative positions of each of the linear members along the plane surface.

Accordingly, when the inflatable structure is not being deployed, a degree of freedom is allowed for the spacing between each of the linear members; therefore, the structure can be folded without obstructing the folding of the membrane members. On the other hand, when the inflatable structure is deployed, the positions of the membrane members are fixed along the height of the structure and along the flat plane of the structure so that the antenna function can be maintained.

Further, in accordance with the present invention, there is provided a method of deploying an inflatable structure that is comprised of a cylindrically shaped membrane with a multi-layer structure including an airtight layer that forms an airtight space inside, and a rigidizing layer that is provided outside the airtight layer and is formed of a triaxial woven fabrics of reinforcing fibers, the method characterized by comprising:

folding the cylindrically shaped membranes in advance in such a way that lines on the cylindrically shaped membrane which intersect a plurality of surfaces perpendicularly intersecting the cylinder axis each form a valley line, and neighboring valley lines along the direction of the axis perpendicularly intersect each other alternately at the points on the cylinder axis;

filling gas inside the airtight layer of the folded membrane to make the membrane into the cylindrical shape; and curing the rigidizing layer in the state where the membrane has the cylindrical shape.

In accordance with the present invention, since the valley lines neighboring along the direction of the axis alternately intersect each other perpendicularly at the cylinder axis portion, a channel for gas passage is secured along the cylinder axis portion, so that the gas can be spread immediately throughout the entirety of the structure when the gas is filled in. Further, since there are formed no unpredictable wrinkles or the like other than the peak lines and the valley lines which are created when folding the structure, the reproducibility of the inflatable structure upon its deployment is excellent. Further, since the shape of the structure when folded itself exhibits a spring property which allows its deployment along the cylinder axis, the structure can readily unfurl when it is deployed.

BRIEF DESCRIPTION OF THE DRAWINGS

FIG. 3 is a plan view illustrating how the inflatable structure according to the embodiment of the present invention is deployed;

FIG. 5 is a plan view of the array antenna;

BEST MODE FOR CARRYING OUT THE INVENTION

Hereinafter, a preferable embodiment of the present invention is explained in detail as an example, with reference to the diagrams. However, the dimensions, materials, shapes, relative arrangements and the like of the constitutive parts described in this embodiment are not intended to restrict the scope of the present invention, unless particular limitations are specified therefor.

First, an inflatable structure according to an embodiment of the present invention will be explained with reference to FIG. 1 and FIG. 2.

Figure 1:
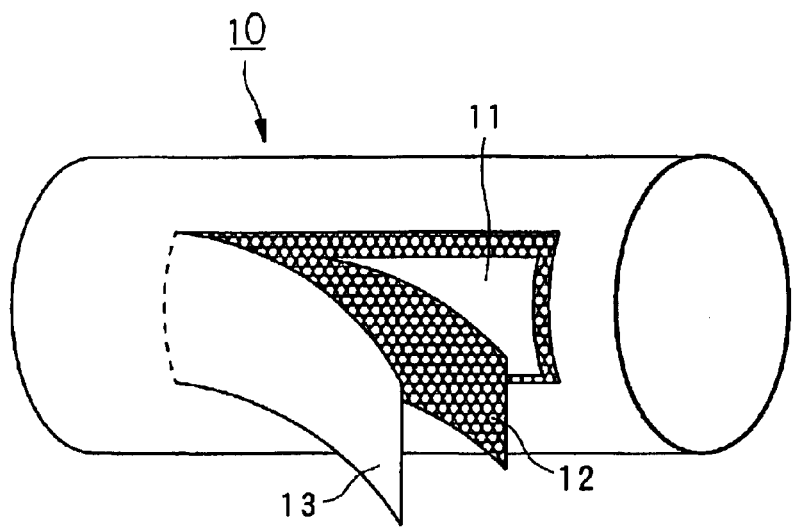
FIG. 1 is a partially fractured perspective view of an inflatable structure according to an embodiment of the present invention.
Figure 2:
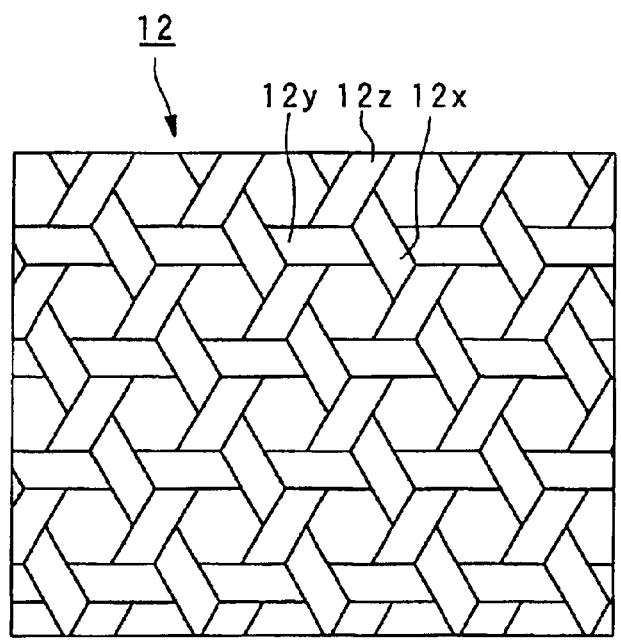
FIG. 2 is a plan view of a triaxial woven fabrics.

FIG. 1 shows a part of the inflatable structure according to the embodiment of the present invention, with a part thereof shown in a fractured state for the explanation. Note that a part of the inflatable structure shown in FIG. 1 is cylindrically shaped, and, for example, is used as a part of an inflatable structure shaped as a ring tube.

The inside of the inflatable structure according to the embodiment of the present invention is composed of a bag-shape membrane inside which gas is sealed. However, the bag shape is not evident in FIG. 1 since only a part thereof is shown.

Further, in the embodiment of the present invention, the bag-shape membrane is composed as a multi-layer structure composed of a plurality of layers.

In other words, the membrane of an inflatable structure 10 which is composed of the multiple layers has an airtight layer 11 for forming an airtight space inside; a rigidizing layer 12 provided on an outer side thereof; and a protective layer 13 provided to the outer side of the rigidizing layer 12. However, depending on the usage environment and the like, the construction is also possible in which the protective layer 13 is not provided.

The above-mentioned construction enables the inflatable structure to be stored folded up inside a rocket fairing, and deploy to reassume its original shape in outer space after the rocked is launched.

The deployment of the inflatable structure is performed by filling gas into the space inside the airtight layer 11 to inflate the airtight layer 11. The filling of gas is performed by using, for example, an inflation system and a flexible pipe or the like.

Further, in accordance with the present embodiment, the rigidizing layer 12 is composed of a triaxial woven fabrics of reinforcing fibers. The triaxial woven fabrics is explained with reference to FIG. 2. FIG. 3 is a plan view of the triaxial woven fabrics, which is used as the main material of the rigidizing layer 12.

The triaxial woven fabrics structure is formed by weaving together reinforcing fiber bands $12x$, $12$ and $12z$, such that they intersect each other at equal 60-degree angles.

This structure not only enables the reinforcing fibers to exhibit their great elasticity, but also quasi-isotropy, such that mechanical characteristics are uniform across the plane. Therefore, when the triaxial woven fabrics is applied to the structure, the distortion and the deformation caused by the structure as in the biaxial woven fabrics do not occur.

Further, the rigidity of the rigidizing layer 12 is increased by this woven structure, which is woven without slack, as is clear in the diagram.

Thus, great rigidity can be realized even with the woven structure having a low fabric construction. Accordingly, the rigidity required in a large-scale structure can be obtained, and moreover it becomes possible to build a high-precision structure in which the distortions and deformations occurring with the increased size are suppressed.

Further, the triaxial woven fabrics used in the rigidizing layer 12 is obtained by weaving together the three reinforcing fiber bands without slack, so that they do not loosen from the woven structure. Accordingly, shifts in the woven structure which would occur when it is rolled or folded up small during storage in the fairing can be prevented. Therefore, the structure can be stored easily inside the fairing, and its original shape can be reproduced with a high degree of precision upon deployment of the structure in outer space.

By particularly using the low fabric construction triaxial woven fabrics for the rigidizing layer, the above-mentioned characteristics of the rigidizing layer are clearly demonstrated, the characteristics thereof are clearly demonstrated, thereby making it possible to obtain a structure which not only exhibits an excellent ability to follow up a three-dimensional curved surface, but also has a light mass and high rigidity.

Further, as the matrix resin of the triaxial woven fabrics that constitutes the rigidizing layer 12, it is preferable to use a material which is impregnated with a long shelf life prepreg resin.

Explanation will now be made regarding the above point.

Typically, when the inflatable structure is going to be applied in a spaceborne structure, at least 6 months are required for procedures up to the launch, such as machining, assembling and testing the inflatable structure, including scheduling adjustments for the machining, and testing/adjusting the various equipment.

When these procedures are performed, there is a restriction on time for which a typical FRP prepreg can be used at normal temperature; therefore, it becomes necessary to perform temperature management and the like, which considerably hurts its workability.

In contrast, when the long shelf life prepreg resin, which does not cure at a normal temperature, is used for the rigidizing layer 12 matrix resin, stable characteristics can be maintained over a long period of time; therefore, the workability can be improved, and its reliability for spaceborne applications can be improved.

In this way, the space inflatable structure is mounted onto the rocket after it is assembled on the ground, and it is stored compactly until deployed in outer space. By using the triaxial woven fabrics and the impregnated long-life resin (various curing-type triaxial woven fabrics prepregs) for the rigidizing layer 12, the space inflatable structure can be maintained in a stable state for a long period of time.

Further, in order to construct the rigidizing layer 12 such that it cures after the inflatable structure is deployed, the rigidizing layer 12 is composed of a resin impregnated with an uncured resin.

Resins that cure according to various methods may be used for the uncured resin. For example, resins which cure with heat, pressure, ultraviolet rays, reactive gas or electricity may be used.

Further, regarding the materials for the airtight layer 11 and the protective layer 13, when the inflatable structure is deployed, it is preferable that the material of the airtight layer 11 has a greater deformation rate in the direction of deployment than the deformation rate of the protective layer 13.

Accordingly, since the deformation rate of the airtight layer 11 on the inner side is greater, the deployment of the inflatable structure causes pressure to be applied on the rigidizing layer 12 toward the outer side. On the other hand, since the deformation rate of the protective layer 13 provided on the outer side is smaller, the protective layer 13 is also pressed against the rigidizing layer 12 by the rigidizing layer 12 pressing against it.

As a result, the rigidizing layer 12 is pressured by both the airtight layer 11 and the protective layer 13, whereby its adhesion to each of the layers increases. Therefore, since the layers become more of an inseparate structure and thus become stronger, flexibility after curing can be improved, and the stability of the dimensions can be further increased.

Explanation will now be made of more specific examples of structures for varying the above-mentioned deformation rates.

One example is constructing the airtight layer 11 and the protective layer 13 with membranes having mutually different degrees of extensibility.

That is, the airtight layer 11 is made of a highly extensible film and the protective layer 13 is made of a film having low extensibility, and these films sandwich the triaxial woven fabrics prepregs which serve as the rigidizing layer 12. By using this construction, when the structure is inflated (deployed), the highly extensible film on the inner layer (the airtight layer 11) applies pressure on the rigidizing layer 12 toward the highly rigid, inextensible film (the protective layer 13), thereby increasing the degree of adhesion between each of the layers.

Further, another example is given in which the airtight layer 11 and the protective layer 13 are constructed with mutually different membrane thicknesses.

That is, in the above-mentioned example, the film on the outer side of the rigidizing layer 12 has a greater tensile elasticity than the film on the inner side, and the outer film exhibits its pressuring effect by resisting the inflation of the film from the inner side.

Therefore, since it is sufficient if a similar pressuring effect is demonstrated, the pressuring effect can be realized by varying the thicknesses of the membranes to give them different deformation rates, even if specifications regarding the tensile elasticities of the membranes are not varied.

In other words, by making the membrane thickness of the inner airtight layer 11 thin and the membrane thickness of the outer protective layer 13 thick, when the structure is deployed, the deformation rate of the airtight layer 11 which has the thinner membrane will be greater than the deformation rate of the protective layer 13 having the thicker membrane, thus achieving a pressuring effect similar to the one mentioned above.

Reasons for increasing the adhesion among the layers in this way will now be explained in more detail.

Since there are openings in the triaxial woven fabrics and in the matrix resin, it is difficult to maintain the high degree of adhesion. Further, in the case of the construction where the rigidizing layer 12 is cured by heat, vaporized matter and the like generated in thermal curing becomes inflated in the vacuum of outer space and damage the adhesion between the layers, such as between the rigidizing layer 12 and the airtight layer 11.

Therefore, the adhesion among the layers is increased in accordance with the above-mentioned construction to achieve an integrated construction with no openings between the layers, which increases the rigidity of the membrane.

Explanation will now be made of another construction for increasing the adhesion among the layers as described above.

The protective layer 13, which is the layer outside the rigidizing layer 12, maybe provided with gas escape holes to increase the adhesion.

The reason for this is that vaporized matter and the like, generated by the thermal curing, becomes inflated in the vacuum of outer space and lodge between the layers such as between the rigidizing layer 12 and the airtight layer 11, as described above. Therefore, expelling these through the gas escape holes eliminates spaces between the layers.

Therefore, when the above-mentioned construction using the different deformation rates to increase the adhesion is combined with the construction having the gas escape holes, the adhesion among the layers can be increased more effectively. This enables further strengthening of the construction, and also improvement of its reliability.

Incidentally, large-scale inflatable structures can be constructed by connecting a plurality of units. For example, the ring tube can be formed by connecting a plurality of the cylindrically shaped tubes.

In the above-mentioned case, it is preferable to use reinforcing rings as tube connecting portions (joint portions). A preferable example of a reinforcing ring is an FRP ring using reinforcing fibers such as PBO fibers, aramid fibers, carbon fibers, glass fibers or the like.

Thus, when the reinforcing rings are used at the joint sections of the inflatable structure, formation also becomes easier, and it becomes possible to maintain a high degree of precision in the working of the FRP ring. Therefore, in a case where it is necessary to use the inflatable structure to extend the membrane surface, the use of the reinforcing ring facilitates accuracy in the dimensions and positioning of an interface connection point, thereby efficiently enhancing its stability.

Note that, if the triaxial woven fabrics is used as the material for the reinforcing ring, the ring can be made thin and light, whereby it becomes possible to obtain a reinforcing ring which is flexible but has excellent shape retention.

Further, when using the above-mentioned reinforcing ring structures, a spring or the like for extending the membrane structures of a plane antenna or the like and giving them a tensile force can be incorporated into the reinforcing rings. As such, the springs or the like can be protected at the time of the rocket launch.

Further, by using the reinforcing ring structure it is possible to provide a hardpoint in the assembly of the structure.

However, the joint means of the inflatable structure is not restricted to the ring structure. Depending on the shape and configuration of the structure to be built using the inflatable structure, any shape/construction can be used.

Even when another shape/construction is used, the joint means is made to keep sufficient rigidity against the inflatable structure while being flexible, so that it can function as the hardpoint to thereby enhance the precision of the dimensions and the positioning of the structure.

Further, in these configurations, the FRP ring or other such reinforcing ring used at the joint sections is elastic and flexible, and can be elastically deformed so that it can be stored easily when stored in the rocket fairing. Further, the given shape of the space inside the reinforcing ring can be maintained; therefore, when the gas is removed from the ring tube or the like, the ring tube or the like can be folded up and stored in the space inside.

Here, when removing the gas and folding the membrane which constitutes the inflatable structure according to the embodiment of the present invention and which is constituted by the multi-layer structure, it is not necessary to create particular creases or employ a regular folding technique or the like because, due to the quasi-isotropy, the membrane is extremely flexible and exhibits excellent reproducibility (i.e., its ability to easily reassume its original shape).

Therefore, in the case where the above-mentioned reinforcing ring is used, the membrane composed of the multiple layers can be put inside the FRP ring just as it is.

Further, in the case where the reinforcing ring is made to also function as a storage container, it can effectively protect the membrane composed of the inflatable multi-level structure. Further, coupling and fastening the reinforcing rings together can increase the rigidity during the storage, to effectively deal with the severe vibration conditions encountered when the rocket is launched.

As described above, the inflatable structure according to the embodiment of the present invention demonstrates the following operational effects, and demonstrates these effects in many applications including space development, whereby it contributes to the development of industry.

(1) By using the low fabric construction triaxial woven fabrics composite material for the rigidizing layer of the membrane composed of multiple layers, it becomes possible to obtain a structure which is lightmass and excellent in terms of dimensional stability and durability.

(2) Excellent storage is exhibited when the inflatable structure is stored in the rocket fairing.

(3) The inflatable structure can readily deploy in outer space, and moreover little material damage is suffered when folded up so that it can exhibit excellent strength after deployment.

(4) The triaxial woven fabrics of the basic structure of the rigidizing layer is a skeletal structure having hexagonal open hole portions; therefore, the probability of damage being suffered due to space debris and the like can be kept low.

(5) By using the triaxial woven fabrics for the rigidizing layer, the structure possesses quasi-isotropy and therefore excellent shape retention while also simultaneously having appropriate elasticity; therefore, the inflatable structure is suitable as a support structure for the membrane-type structure.

(6) The three-dimensional curved surface of the ring structure is followed up excellently, so that only few joint portions are needed.

(7) By using the long shelf life prepreg resin, which can be maintained in the uncured state in a stable way over a long period of time even at normal temperature, the inflatable structure exhibits excellent storability on the ground.

(8) By sandwiching the rigidizing layer during the thermal curing to apply pressure to it, the cured composite material becomes more stable.

(9) By using the FRP ring or other rigid connecting material for the joint portion in the inflatable structure, the joint portion can function as a hardpoint to improve the precision of the dimensions and positioning of the structure.

(10) By using the FRP ring or other rigid connecting material as the storage container during storage, the storage space can be made compact, and the connecting material can effectively protect the soft membrane structure which has not cured yet, and also can facilitate the inflation/deployment thereof by serving as a point of support during the deployment process. Further, coupling these connecting members together further increases the rigidity during storage.

Next, explanation will be made of a more specific example of the inflatable structure according to the embodiment of the present invention explained above, and regarding an object arranged in outer space that is provided with the inflatable structure.

As one example, explanation will now be made of a case where the inflatable structure is realized as the ring tube-shape inflatable structure.

Specifically, the ring tube is made using a polyimide film having a thickness of 25 µm and 80% extension percentage is used as the airtight layer 11.

A low fabric construction triaxial woven fabrics (SG-801:T300-6K Basic) is fitted and wrapped around the three-dimensional curved surface of the ring-shape tube around the outer layer of the tube-shape airtight layer 11. Then, a long-life thermosetting resin which is capable of maintaining a half-cured state over a long period of time is impregnated by a proper amount, thus forming the rigidizing layer 12 while it is in its prepreg state.

In order to prevent the rigidizing layer 12 from tucking, a black type polymide membrane having a thickness of 25 m and 40% extension percentage, and which is also for heat insulation, is wrapped around the outer layer of the rigidizing layer 12. This serves as the protective layer 13.

Further, for the protective layer 13, it is desirable to wrap an MLI (Multi Layer Insulation: multi-layer thermal insulation material) or the like around the outermost layer as well, to improve the thermal insulation effect.

Next, a case of an antenna will be explained with reference to FIG. 3, as an example of an object arranged in outer space which employs the inflatable structure.

FIG. 3 is a schematic plan view of an antenna equipped with the inflatable structure according to an embodiment of the present invention. Note that FIG. 3(A) illustrates the state during storage, and FIG. 3(B) illustrates the state when the structure is deployed.

In accordance with the present invention, a plurality of cylindrically shaped membranes composing the inflatable structure 10 are used, and the two ends thereof are each connected by means of FRP rings 21 serving as reinforcing rings, whereby the inflatable structure have a ring shape as a whole is formed.

More specifically, in the case shown in the diagram, the ring-shape inflatable structure is composed of 24 cylindrically shaped membranes linked together. Further, engaging portions of each of the cylindrically shaped membranes link each of the ends of the cylindrically shaped membranes through the FRP rings 21, thus supporting the plane antenna 22 by means of the membrane surface tensioning cables.

FIG. 3(A) illustrates the state during storage. The ring tubes (round-shape membrane) forming a part of the inflatable structure is folded up between the FRP rings 21 to become compact so as to be stored easily inside the rocket fairing.

The above mentioned ring tube structures are not particularly provided with folding creases or other such structures for facilitating the folding process, and are not processed to fold in a regular way. Nevertheless, as shown in the diagram, once the structure is filled with the gas (i.e., the state shown in FIG. 3(B)), when the gas is removed the structure collapses in toward inside of the FRP rings 21 as the pressure decreases, to be stored as shown in FIG. 3(A), and when it is refilled with the gas, it can be returned to its original state (i.e., the state shown in FIG. 3(B)).

As described above, the FRP rings 21 function as a storage container into which the membrane-type inflatable structure is folded, so that the soft membrane structure before curing can be maintained and protected. Therefore, the inflatable structure can be effectively protected from the severe vibrations experienced at the time of the rocket launching. Further, the inflatable structure, which typically cure, can be protected from the heat, ultraviolet rays and radiation waves in outer space until the sequence to deploy the inflatable structure is begun in outer space.

Further, in the above mentioned constructions, if neighboring FRP links are made capable of connecting to each other, when the above-mentioned inflatable structure is stored the rigidity of the above structure can be further increased, whereby the inflatable structure can effectively cope with the sever environment encountered at the time when the rocket is launched.

FIG. 3(B) illustrates the state where the structure is filled with the gas and deployed in outer space, with the rigidizing layer cured and the plane antenna 22 extended. Note that FIG. 3(B) is drawn in reduced scale as compared with FIG. 3(A). However, in accordance with the present construction, the large-scale antenna can be extended.

Further, by pulling it with a uniform tensile force from the FRP rings 21 by using the tensioning cables, the plane antenna 22 can be deployed/supported with a high level of precision across its flat plane.

Next, a preferable embodiment of an array antenna in which the above-mentioned inflatable structure is applied will be explained with reference to FIG. 4–FIG. 12.

Figure 4:
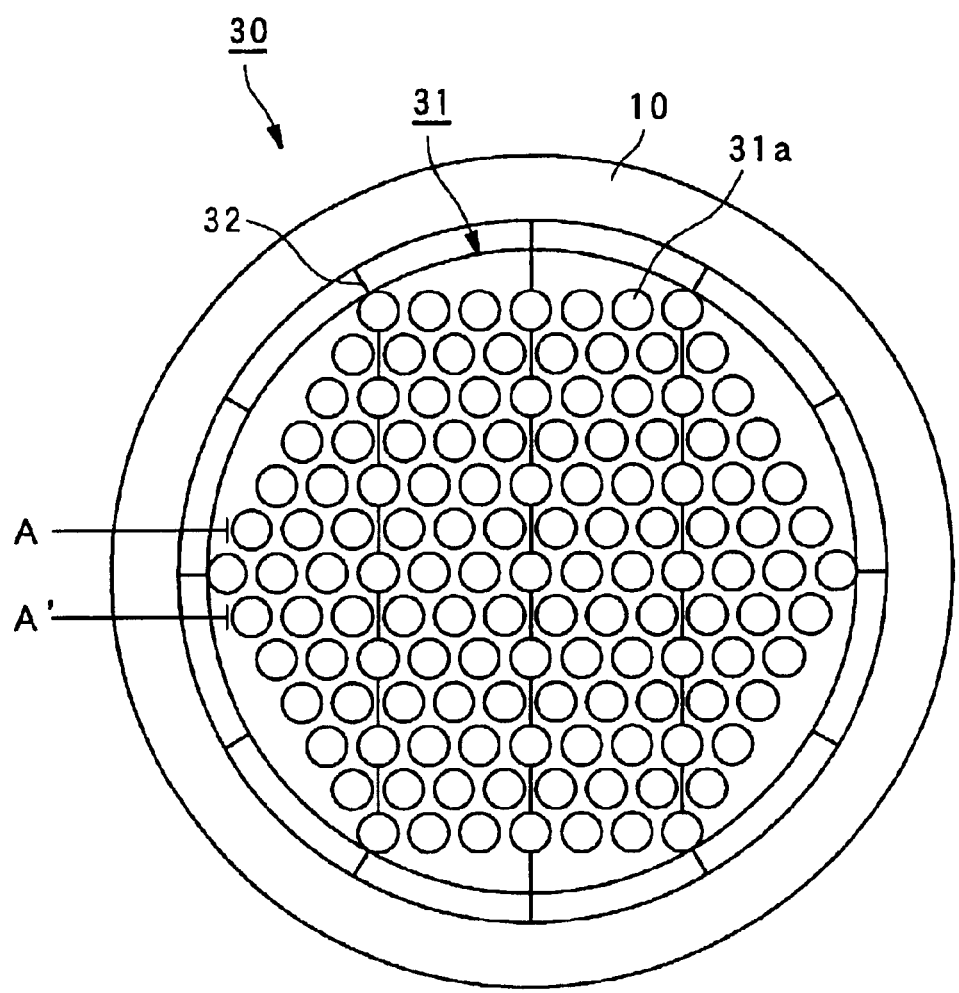
FIG. 4 is a plan view of an array antenna provided with the inflatable structure according to the embodiment of the present invention.

FIG. 4 is a plan view of an array antenna equipped with the inflatable structure according to the embodiment of the present invention.

As shown in the diagram, an array antenna 30 is basically composed of an inflatable structure 10, a plane antenna 31 and cables 32 serving as the linear members for extending the plane antenna 31 by means of the inflatable structure 10.

A plurality of conductive non-woven fabrics 31a serving as radiatied element are arranged onto the plane antenna 31.

Here, the conductive non-woven fabrics 31a may be arranged such that the conductive non-woven fabrics 31a are in mutual square peaks as in FIG. 5(A), or such that the conductive non-woven fabrics 31a are in mutual triangular peaks as in FIG. 5(B). Note that the latter case has an advantage that the number of the conductive non-woven fabrics 31a can be less than in the case of the square arrangement, under identical conditions for preventing occurrence of a grating lobe.

However, the method of arranging the conductive non-woven fabrics is not limited to the above-mentioned arrangements and may be determined as necessary according to the conditions under which they will be used and the like. Further, there are no particular restrictions as to the shape of the conductive non-woven fabrics 31a either; rather, a round shape, a square shape, a polygonal shape, a ring shape or the like may be used according to the conditions under which they will be used and the like.

The plane antenna 31 according to the present embodiment used is a so-called array antenna or patch antenna.

The construction thereof can be determined more specifically according to the method by which its power source is supplied. Here, preferable feed methods for use with the present embodiment include an electromagnetic coupling-type feed method, and a coplanar feed method. An example of a construction for each case will be explained.

Figure 8:
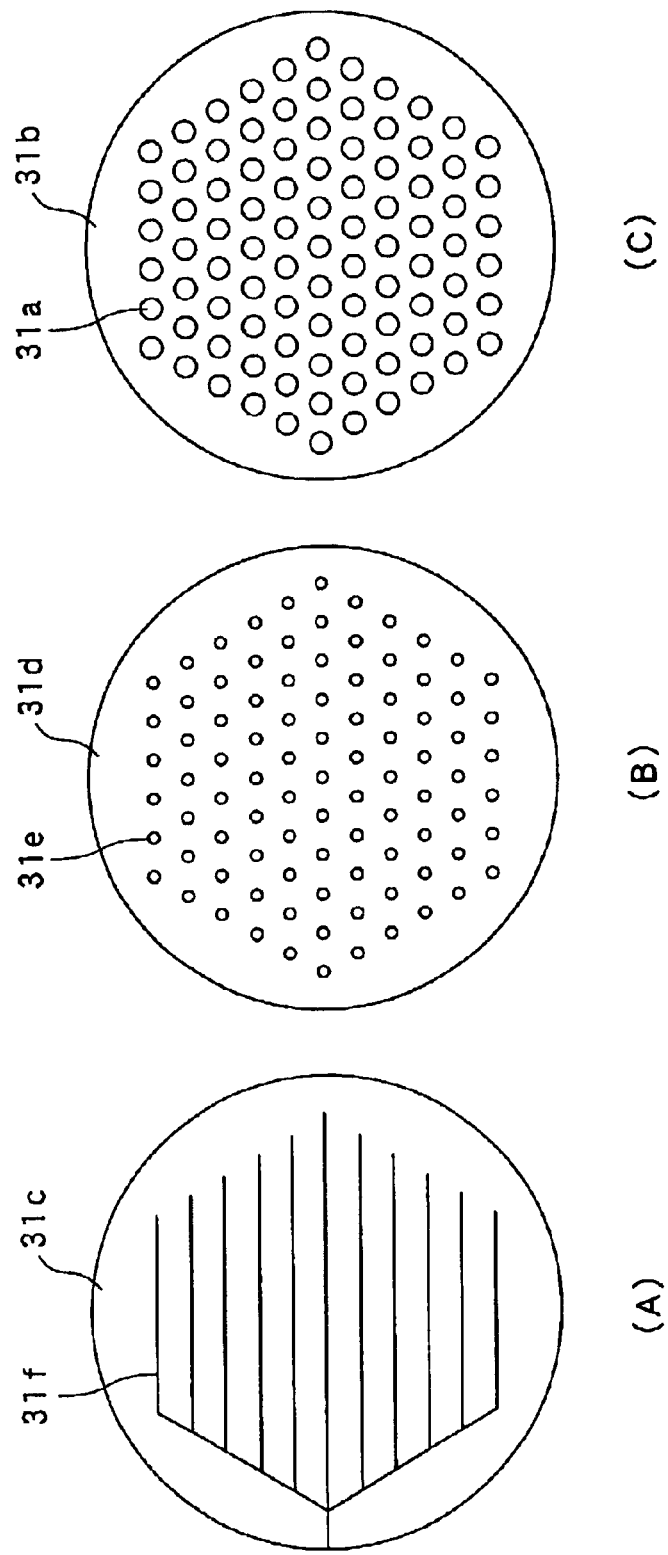
FIG. 8 is an exploded view of parts used in the array antenna.

First, an example of a construction used in the case of the electromagnetic coupling-type feed method will be explained with reference made to FIG. 6 and FIG. 8.

Figure 6:
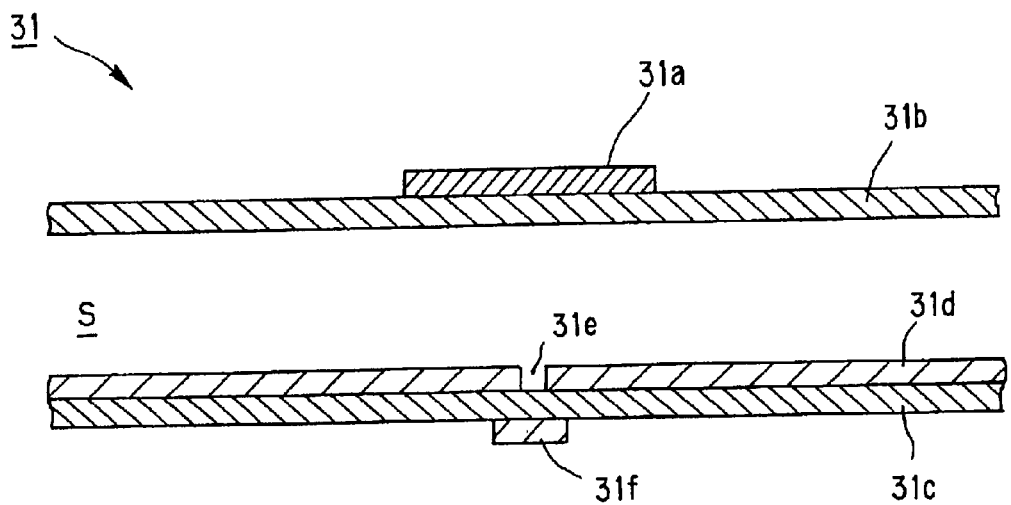
FIG. 6 is a cross-sectional view of the array antenna.

FIG. 6 is a schematic cross-sectional view of the plane antenna 31, corresponding to a cross section along AA' in FIG. 4. FIG. 8 is an exploded view of parts used in the array antenna shown in FIG. 6.

As shown in the diagrams, the plane antenna 31 is basically composed of a first membrane member 31b and a second membrane member 31c which are both composed of the triaxial woven fabrics. An area between the first membrane member 31b and the second membrane member 31c becomes a vacuum space s in outer space.

Further, the above-mentioned plurality of conductive non-woven fabrics 31a are formed to an outer surface of the first membrane member 31b. There are not particular restrictions as to a method for forming the conductive non-woven fabrics 31a onto the first membrane member 31b; however, for example, it is possible to impregnate the conductive non-woven fabrics with resin or adhesives to adhere/form them by applying heat.

Further, a conductive membrane 31d serving as a ground surface is formed onto an inner-side surface of the second membrane member 31c (the surface facing the first membrane member 31b). Further, the surface on the outer side of the second membrane member 31c is formed with a microstrip power supply line 31f forming power supply points for each of the conductive non-woven fabrics 31a which serve as radiatied element.

Further, the conductive membrane 31d is provided with a power supply opening portion 31e at positions corresponding to each conductive non-woven fabric 31a.

The above-mentioned construction allows the plane antenna 31 to function as an array antenna using an electromagnetic coupling-type feed method. Note that explanations of functions and principles and the like of the array antenna have been omitted since it is a publicly known technique.

Further, it is preferable to provide an amp to the power supply to control phases and amplitude of electric waves, to thereby make the antenna function as an active-phased array capable of easily correcting beam direction and beam shape. This is to ensure that the antenna will function as an antenna even when the orbit and orientation of the antenna become misaligned in outer space. The same is true for the following constructions as well.

As described above, in accordance with the present embodiment, the first membrane member 31b and the second membrane member 31c which form the bases of the array antenna are constructed of the triaxial woven fabrics; therefore, the same effect as obtained in the case where the triaxial woven fabrics is applied in the above-mentioned inflatable structure can be attained.

That is, not only is the great elasticity of the reinforcing fibers demonstrated, but also the surfaces becomes pseudo-isotropic, such that its mechanical characteristics are uniform across the plane. Therefore, it becomes possible to realize an antenna with a high degree of rigidity and with a high degree of precision in which the distortions and deformations concomitant with increased scale are suppressed. Further, the antenna can be folded up to be extremely compact, and when it is deployed it can be returned to its original shape with a high degree of precision.

Further, since the radiated element are composed of the conductive non-woven fabric, the antenna can be folded up extremely compactly without being obstructed.

Figure 7:
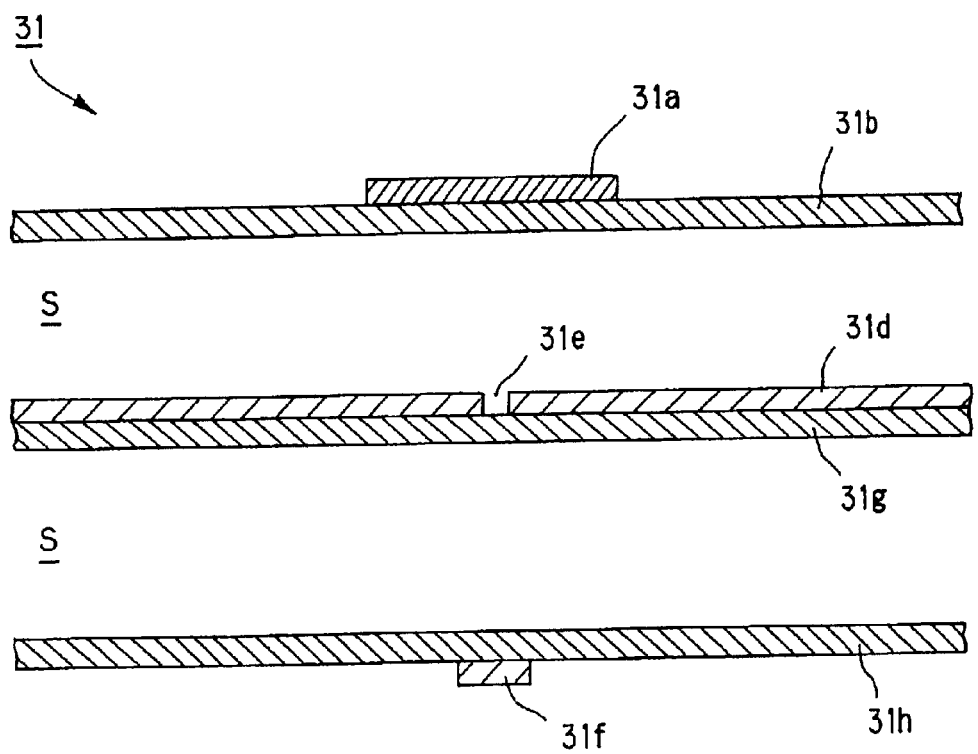
FIG. 7 is a cross-sectional view of the array antenna.

Next, explanation will be made of another example of a construction in the case of the electromagnetic coupling-type feed method, with reference made to FIG. 7. FIG. 7 is a schematic cross-sectional view of the plane antenna 31, and is a view corresponding to the cross section along AA' shown in FIG. 4.

In accordance with the present example, the plane antenna 31 is basically composed of the first membrane member 31b composed of the triaxial woven fabrics, a second membrane member 31g similarly composed of the triaxial woven fabrics, and a third membrane member 31h similarly composed of the triaxial woven fabrics. Areas between each of the membrane members become vacuum spaces s in outer space.

Further, the above-mentioned plurality of conductive non-woven fabrics 31a are formed onto the surface on the outer side of the first membrane member 31b. Further, the conductive membrane 31d to serve as the ground surface is formed onto a surface of the second membrane member 31g which faces the first membrane member 31b. Further, the conductive membrane 31d is provided with the power supply opening portion 31e at the positions corresponding respectively to each conductive non-woven fabric 31a.

Further, a surface on the outer side of the third membrane member 31h is provided with the microstrip power supply line 31f forming the power supply points for each of the conductive non-woven fabrics 31a serving as the radiatied element.

In the present example, the first membrane member 31b, the second membrane member 31g and the third membrane member 31h, which form the bases of the array antenna, are composed of the triaxial woven fabrics, as in the case described above; therefore, the same effect can be obtained as in the case described above.

The difference between the construction shown in FIG. 7 and the above-mentioned construction shown in FIG. 6 is that a predetermined interval is provided between the conductive membrane 31d, which serves as the ground surface, and the microstrip power supply line 31f, which serves as the power supply point.

This is because it may be necessary to provide the predetermined interval between the conductive membrane 31d and the microstrip power supply line 31f depending on the frequency of the antenna that is used.

Next, explanation will be made of an example of a construction in the case of the coplanar feed method, with reference made of FIG. 9 and FIG. 10.

Figure 9:
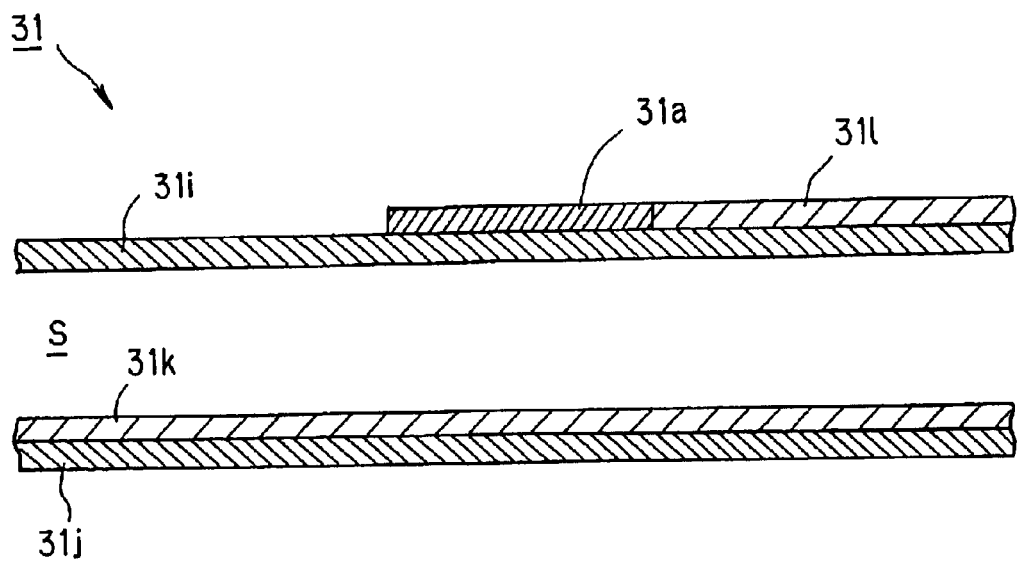
FIG. 9 is a cross-sectional view of the array antenna.
Figure 10:
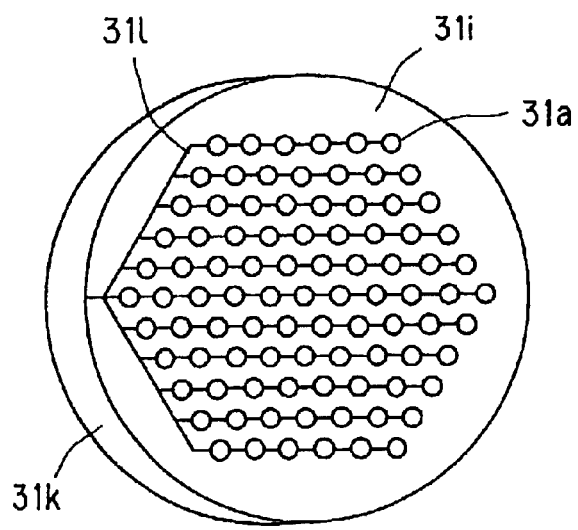
FIG. 10 is an exploded view of parts used in the array antenna.

FIG. 9 is a schematic cross-sectional view of the plane antenna 31 corresponding to the cross section along AA' shown in FIG. 4. FIG. 10 is an exploded view of parts used in the plane antenna 31 shown in FIG. 9.

As shown in the diagram, the plane antenna 31 is basically composed of a first membrane member 31i composed of the triaxial woven fabrics, and a second membrane member 31j which is similarly composed of the triaxial woven fabrics. An area between the first membrane member 31i and the second membrane member 31j becomes the vacuum space s in outer space.

Further, the above-mentioned plurality of conductive non-woven fabrics 31a are formed onto a surface on an outer side of the first membrane member 31i.

Further, a conductive membrane 31k serving as the ground surface is formed onto a surface on an inner side of the second membrane member 31j (a surface facing the first membrane member 31i). Further, a surface on an outer side of the first membrane member 31i is formed with a microstrip power supply line 31l for supplying power to each of the conductive non-woven fabrics 31a, which serve as the radiatied element.

The above-mentioned construction allows the antenna to function as the array antenna using the coplanar feed method. Note that since the functions and principles of the array antenna are publicly known, explanations thereof have been omitted.

In the present construction, the first membrane member 31i and the second membrane member 31j, which are the bases of the array antenna, are composed of the triaxial woven fabrics, as they were in the cases mentioned above; therefore, an effect can be obtained which is similar to those of the above-mentioned cases.

Next, respective advantages of employing the electromagnetic coupling-type feed method and of employing the coplanar feed method as the feed method in the present embodiment will now be briefly explained.

In the case of the electromagnetic coupling-type feed method, first, the base is composed of two layers or three layers of the membranes (the membrane members). Therefore, there is an advantage that it can be folded up. In other words, if a rear surface feed method were employed, the membrane surface could not be folded up since a coaxial cable would pass through the ground surface, and it would be inappropriate for use as the antenna according to the present embodiment.

Further, since the electric discharge surface and the power supply line surface are not the same surface, there is an advantage that the antenna is unlikely to be influenced by unnecessary radiation from the power supply line.

On the other hand, in the case of the coplanar feed method, the base is constructed with the two layers of the membrane, as in the above-mentioned electromagnetic coupling-type feed method. Therefore, there is an advantage that the antenna can be folded up.

Further, in the case of the electromagnetic coupling-type feed method, three layers of the membranes may be necessary depending on the frequency of the antenna that is used. By contrast, in the case of the coplanar feed method, there is an advantage that two layers are sufficient regardless of the frequency. This is because the power supply line can be mounted to the same surface as the radiation surface that the radiatied element are on.

Here, evaluations were performed to compare the gain when using various materials versus silver plate copper leaf, as examples of materials for the elements used as the above-mentioned conductive non-woven fabrics 31a. For the evaluations, a model which was based on the above-mentioned constructions and is shown in FIG. 6 was used. A specific example of the sample used in the evaluation is shown in FIG. 11.

Figure 11:
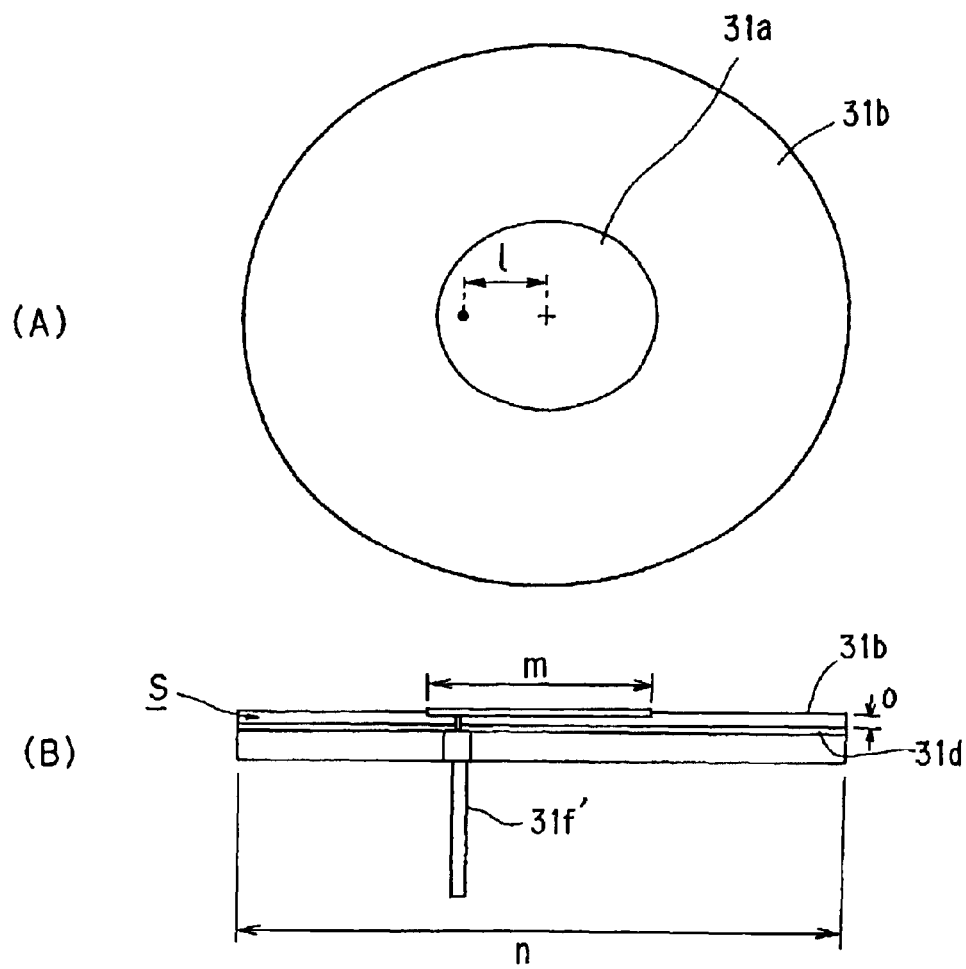
FIG. 11 is a schematic diagram of the array antenna used in an evaluation.

As shown in FIG. 11, the model used for the evaluation uses a round base (which is the membrane member composed of the triaxial woven fabrics) having a diameter n of 165 mm, and a round patch (which is the conductive non-woven fabric or the like) having a diameter m of 60 mm is formed concentrically on top of that.

Further, a spacing O between the membrane member and the conductive membrane is set as O=4.2 mm. Note that air serves as a dielectric in the space therebetween. Further, the distance l from the power supply point to the center of the circle is l=22.5 mm. Note that reference numeral 31f in the diagram is the power supply line.

Patch materials which maybe used for the conductive non-woven fabrics used in the present embodiment include a 50 g/m$^2$ copper fiber conductive non-woven fabric and a 50 g/m$^2$ stainless fiber conductive non-woven fabric, and, for comparison, a silver plate copper leaf material conductive non-woven fabric. Note that those using the silver plate copper leaf are inappropriate for being folded up and cannot be applied in the antenna according to the present embodiment. As to the copper fiber conductive non-woven fabric, two kinds of copper fiber conductive non-woven fabrics having mutually different thicknesses, surface densities and conductivity rates were used.

Results of the evaluations are shown in a table.

Next, explanation will be made regarding a construction for setting the position of the membrane members (membrane surfaces), which serve as the base of the plane antenna 31. Here, the explanation will be made using, as an example, the construction shown in FIG. 6, which has two membrane members; however, a similar construction is also applied in the case of the plane antenna shown in FIG. 7 that is composed of three membrane members, so explanation of the latter one is omitted.

In order for the array antenna to fully exhibit its function as the antenna, precision is required with respect to the spacing between the membrane members and their positional relationships along the plane.

Here, as a construction for realizing this, spacers and coupling members or the like may also be used to determine the positions by directly linking the membrane members together, for example. However, in a case where such a construction is used, the spacers and the coupling members or the like will obstruct the membrane members from being folded up, thus making it difficult to fold them compactly.

Figure 12:
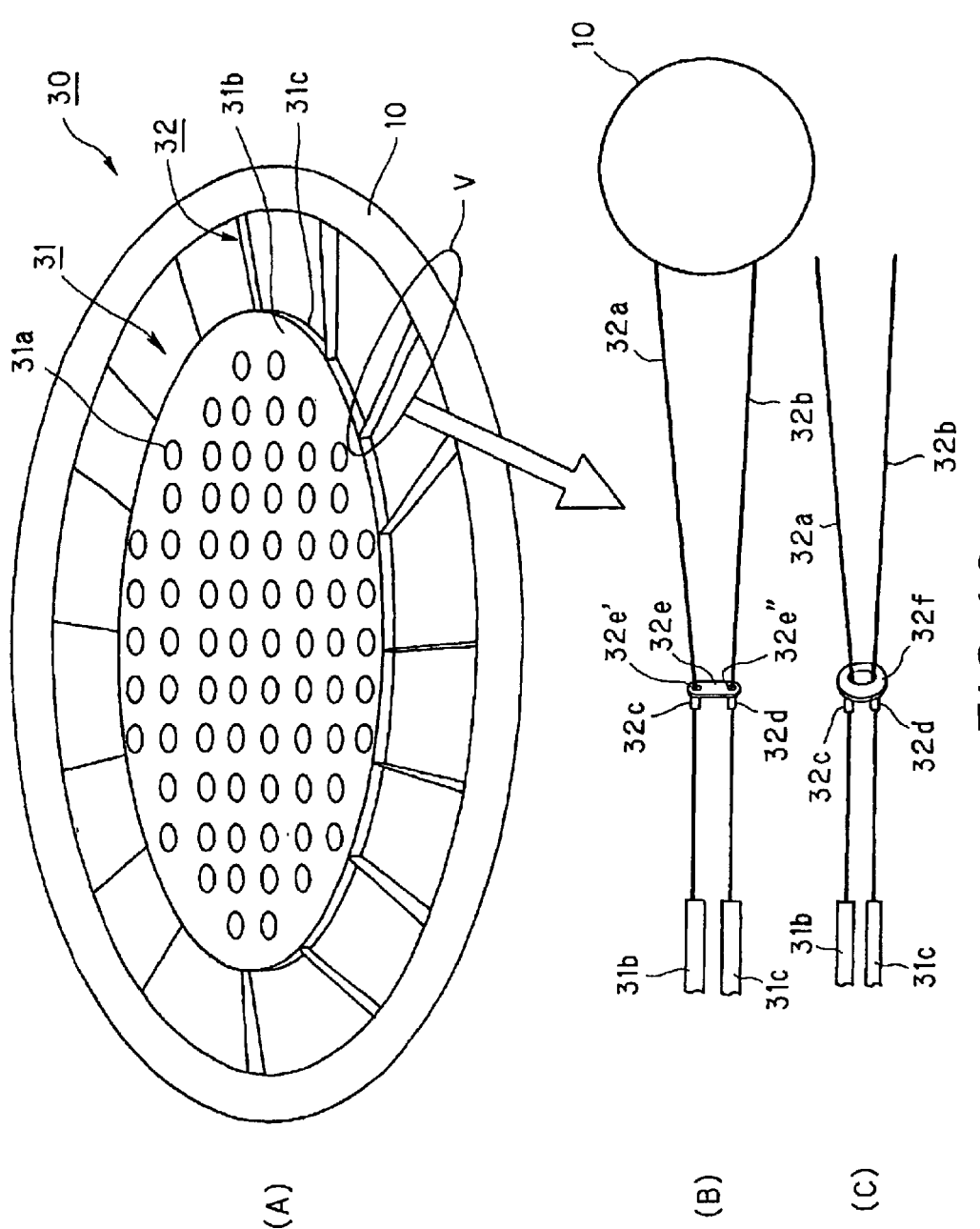
FIG. 12 is a schematic diagram of the array antenna provided with the inflatable structure according to the embodiment of the present invention.

Therefore, a preferable embodiment of a positioning construction, which does not obstruct the folding of the membrane member and which allows precise positioning of the intervals between each of the membrane members and their relative positions along the plane, will now be explained with reference to FIG. 12. FIG. 12 is a schematic diagram of an array antenna equipped with the inflatable structure according to the present embodiment. Note that (A) is a schematic perspective view, and (B) and (C) are lateral views of a V portion shown in (A), each showing different configurations respectively.

The first membrane member 31b and the second membrane member 31c, which are the bases of the plane antenna 31, are each pulled in respectively different directions along the flat plane by means of cables 32a and 32b as linear members, whereby the flat plane surface is maintained.

Here, the first membrane member 31b and the second membrane member 31c are both round in shape and are pulled away from the center of the circle in a radiation pattern (here, the directions in which the pulling forces operate are set such that the angles between the directions of pulling forces exerted by given wires and the directions of pulling forces exerted by the neighboring wires are all equal) and with equivalent force, to thereby maintain a high degree of planarity.

Further, in accordance with the present embodiment, the cables are provided such that they form a pair with each of the membrane members.

TABLE

| Type | Conductive non-woven fabric 1 | Conductive non-woven fabric 2 | Conductive non-woven fabric 3 | Copper leaf |
|---|---|---|---|---|
| Material | Copper | Copper | Stainless | Silver plate |
| Thickness (mm) | 0.045 | 0.090 | 0.045 | 0.040 |
| Surface density (g/m$^2$) | 50 | 150 | 50 | 357 |
| Conductivity (S/m) | $1.3 \times 10^6$ | $1.4 \times 10^6$ | $9.4 \times 10^4$ | $4.0 \times 10^7$ |
| Resonance frequency (GHz) | 2.75 | 2.78 | 2.76 | 2.75 |
| Gain (dBi) | 10.31 | 10.67 | 10.34 | 10.31 |

As is clear in the evaluation results, it was confirmed that the conductive non-woven fabrics made of the various materials, and the silver plate copper leaf which is generally used, exhibit equivalent performance.

One of these pairs is shown in FIG. 12(B).

As shown in the diagram, one end of the cable 32a is fastened to the first membrane member 31b, and the other end is fixed to the inflatable structure 10. On the other hand, one end of the cable 32b is fixed to the second membrane member 31c, and the other end is fixed to the inflatable structure 10.

Further, there is provided a binding member 32e for binding the one pair of the cables 32a and 32b.

The binding member 32e has two holes 32e' and 32e". The cable 32a passes through the hole 32e', and the cable 32b passes through the hole 32e".

The spacing between these two holes 32e' and 32e"0 determines the spacing between the first membrane member 31b and the second membrane member 31c. Specifically, the two holes 32e' and 32e" are positioned such that the spacing therebetween becomes equivalent to the predetermined distance between the first membrane member 31b and the second membrane member 31c. However, the spacing is actually determined by considering the amount of the clearance between the diameters of the holes and the diameters of the cables.

When the structure is not deployed, the binding member 32e can slide freely with respect to the cables 32a and 32b. Further, when in the undeployed state, the diameters of the holes 32e' and 32e" are set such that the binding member 32e does not restrict the spacing between cables, so that there is no obstruction to narrowing the spacing between the cables.

Further, the cables 32a and 32b are each provided with stoppers 32c and 32d in predetermined locations. These stoppers 32c and 32d are able to regulate the slide position of the binding member 32e.

According to the above construction, in the state before deployment, the first membrane member 31b and the second membrane member 31c can be folded up freely without being obstructed by the cables and the binding member 32e which constitute the positioning structure. Therefore, the first membrane member 31b and the second membrane member 31c can be folded up extremely compactly.

Further, by sliding the binding member 32e in the direction of the folded inflatable structure 10, for example, the cables 32a and 32b can be rolled up freely, and the cables can also easily be kept compact.

Further, when deploying the inflatable structure 10, the cables 32a and 32b respectively pull the first membrane member 31b and the second membrane member 31c in a direction parallel to the flat plane.

When this occurs, the cables 32a and 32b are set to pull in a direction in which the distance therebetween becomes gradually larger than the distance which is set between the first membrane member 31b and the second membrane member 31c, as shown in FIG. 12(B).

Accordingly, the binding member 32e slides in the direction of the first membrane member 31b and the second membrane member 31c, and is stopped by the stoppers 32c and 32d to be fixed into the stopped position.

Therefore, the two holes 32e' and 32e" provided in the binding member 32e regulate the spacing (in the height direction) between the first membrane member 31b and the second membrane member 31c, whereby the positioning is determined.

Further, the positional relationship between the first membrane member 31b and the second membrane member 31c along the direction of the flat plane is determined by the positions where the stoppers 32c and 32d are provided, and by the binding member 32e being fixed at the positions where the stoppers 32c and 32d are provided.

As described above, in accordance with the present invention, the positions of the first membrane member 31b and the second membrane member 31c are not determined directly; their positions are determined at positions removed therefrom. Therefore, there is no obstruction to folding, and the positions of the each of the membrane members are determined with a good level of precision.

FIG. 12(C) shows an example of another configuration.

The binding member 32e shown in (B) was provided with two holes, and the cables were passed through each of these; however, a binding member 32f shown in (C) has one hole, and the cables are passed through this. In this configuration, the spacing between each of the membrane members is determined by the diameter of the hole.

However, although the construction shown in (B) can be used even when there are three membrane members by providing three holes in the binding member 32e, the construction shown in (C) cannot be used when there are three membrane members.

Note that a C-ring-shape binding member may be applied in place of the O-ring-shape binding member such as the one shown in FIG. 12(C). The C-ring-shape binding member is easily mounted and removed from the cable, which is convenient when adjusting the distances between the membrane members during testing and the like on the ground.

Next, explanation will be made regarding a method for deploying the inflatable structure according to the present embodiment.

In general, structures which deploy in outer space must do so in a consistent way. First, explanation will be made regarding this point.

In structures which are deployed in outer space, it is necessary to predict the shape that the structure will have mid-way through being deployed, in order to know the disturbance that will be caused to the satellite unit by reactive forces generated upon deployment of the structure, and in order to prevent collision with peripheral instruments or the satellite unit, as well as sensor field obstruction and the like.

Since the space inflatable structure is a structure in which gas is introduced to the interior to inflate it, it is extremely difficult to learn the behavior it will exhibit during the deployment process, and especially its behavior in the microgravity environment of outer space. Further, its behavior at the time of deployment and its shape during the deployment are not easy to reproduce.

Therefore, there is a need for an deployment method capable of predicting the shape of the inflatable structure as it unfurls during the deployment, and confirming the behavior in the earth's gravitational environment.

Until know, attempts have been made using a method in which the interior of the inflatable structure is divided into a plurality of rooms, and these are expanded in order starting at one end; and with a method in which cables and springs are used to restrain and control the deployment action.

However, in methods such as these which involve provision of additional elements, there were problems that the membrane became difficult to manufacture, the mass of the inflatable structure was increased, the folding of the structure was obstructed, and the like.

Therefore, the present inventors have attempted to develop a method for realizing an ideal deployment action, without using the additional elements mentioned above, by devising a good way to fold the membrane.

As described above, the reproducibility of the inflatable structure according to the present embodiment (its ability to reassume its normal shape) upon its deployment is excellent. Therefore, satisfactory shape recovery can be expected even if there is no particular restriction regarding the way it is folded for storage. However, this is not to say that its shape and behavior upon deployment can be predicted.

Further, in the unlikely event that satisfactory shape recovery is not achieved when the structure is deployed in outer space, correction is obviously very difficult. Therefore, near 100% reproducibility is required. Further, it is preferable that the shape and behavior during the deployment can be predicted.

Ways to fold the inflatable structure include a Z-pattern (a zigzag pattern) and a paper lantern pattern (a bellows-like pattern). Note that when the structure folded up in the Z-pattern is viewed from the side, it appears as though the Z's are formed one after another. When the structure folded up in the paper lantern pattern is viewed from the side, larger diameter portions and smaller diameter portions appear in alternation.

However, in the case of the former, since a channel for introducing the gas into the inflatable structure cannot be guaranteed, the structure deploys sequentially starting from the side where the opening for introducing the gas is; therefore, it is difficult to control the speed at which it deploys, and its shape and behavior as it unfurls cannot be predicted. Further, the reproducibility is not quite satisfactory in this case.

Further, the latter case is a folding method whereby larger diameter portions and smaller diameter portions are formed one after the other. As such, wrinkles are inevitably formed in this folding method. Therefore, it is very difficult to predict the shape and behavior of the structure as it deploys. Thus, it is impossible to make predictions as to what would exactly occur during the deployment, and further the reproducibility is not quite satisfactory.

A preferable embodiment of a method of folding and a method of deploying the inflatable structure in which near 100% reproducibility can be anticipated and its shape and the behavior during the deployment can be predicted will now be explained with reference to FIG. 13–FIG. 16.

Figure 13:
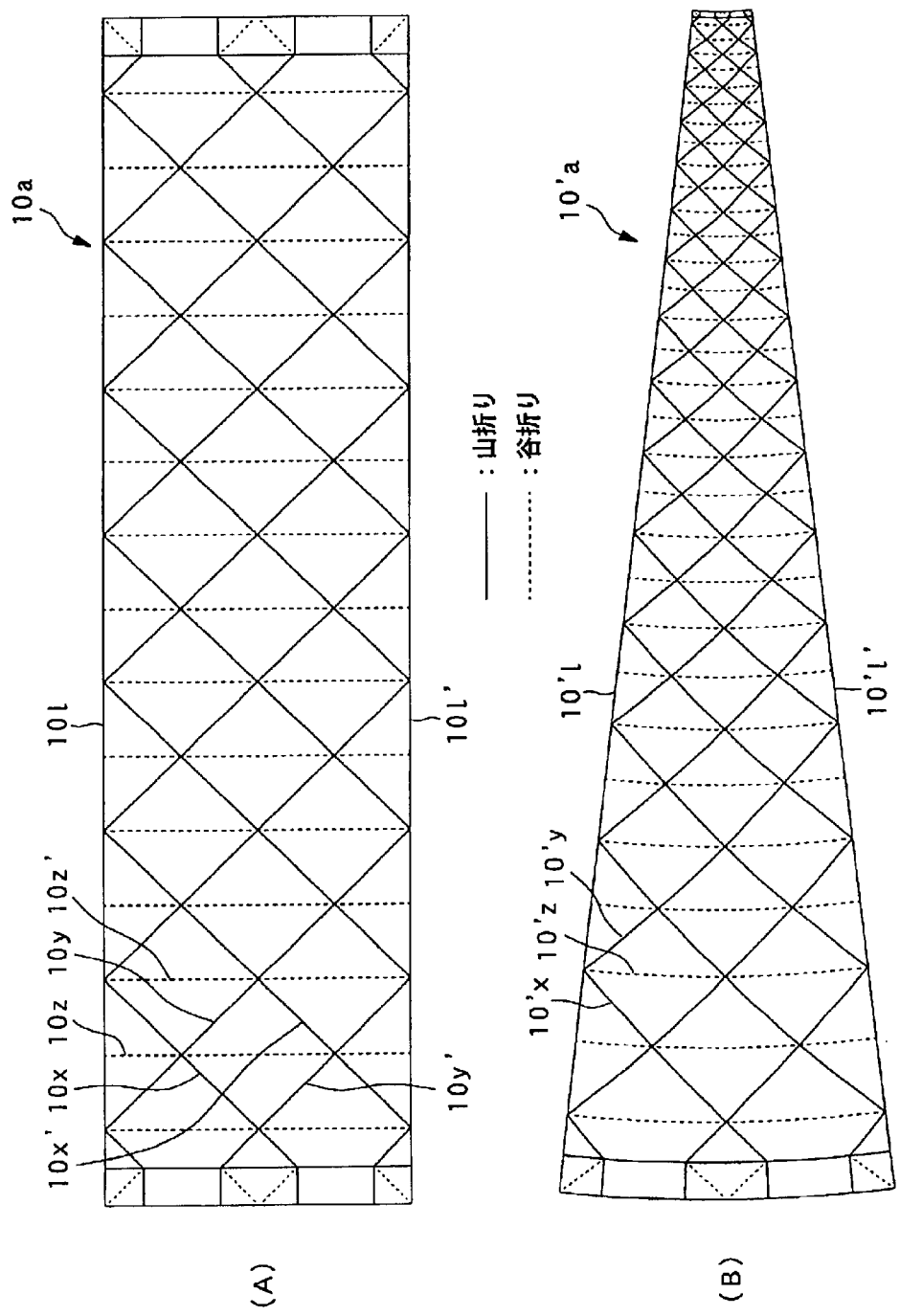
FIG. 13 is a developed view explaining a way of folding walls which constitute the inflatable structure according to the embodiment of the present invention.
Figure 14:
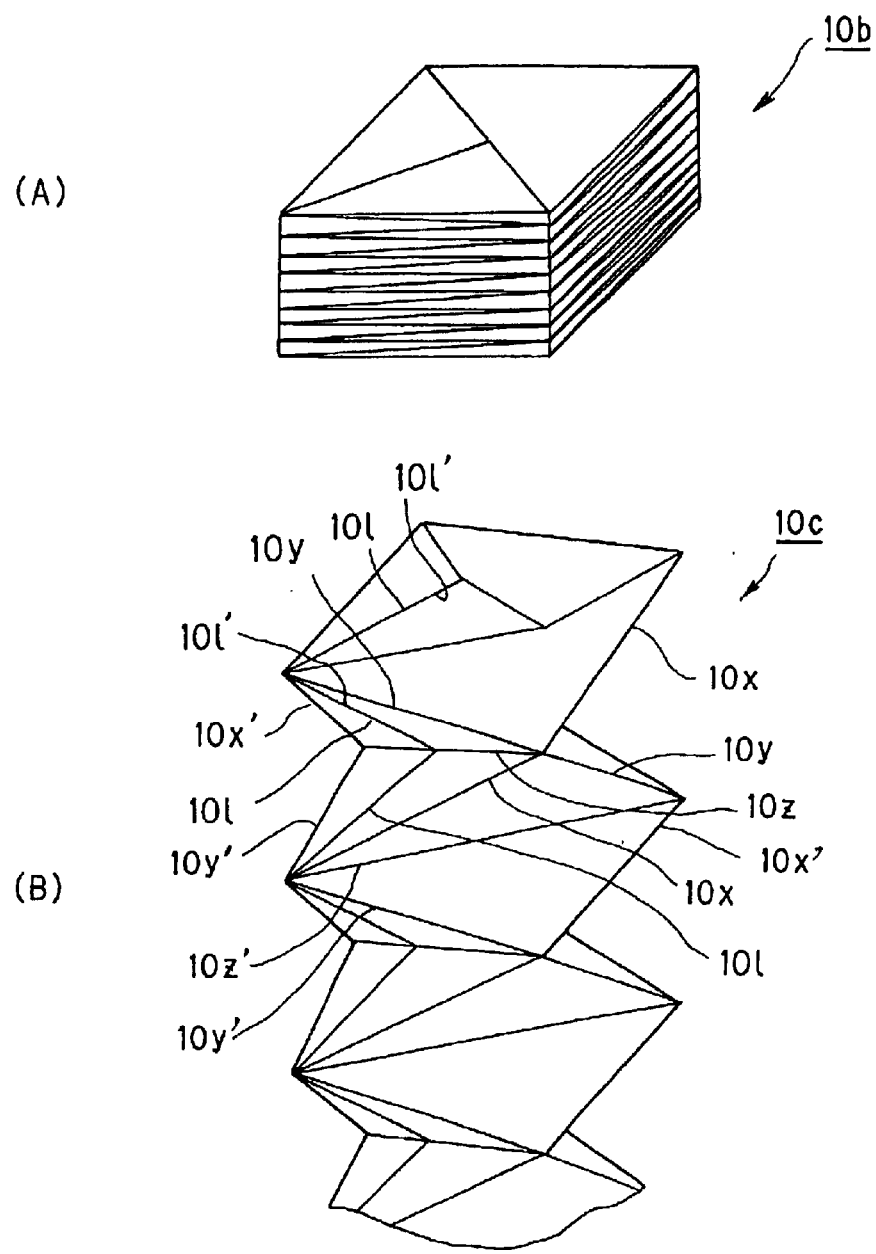
FIG. 14 is a view illustrating changes in the state of the inflatable structure according to the embodiment of the present invention, from its folded state to a state where it is starting to deploy.
Figure 15:
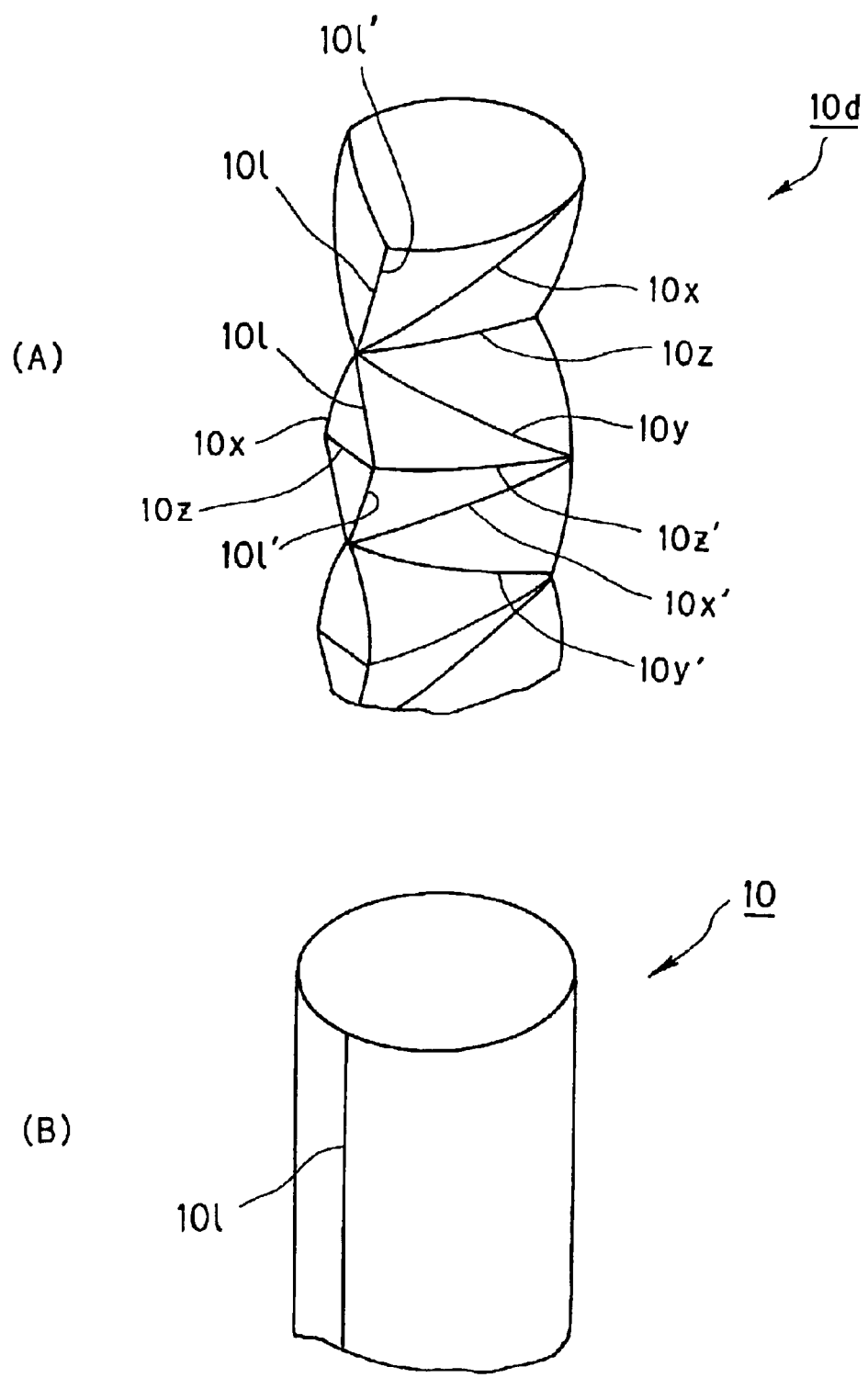
FIG. 15 is a view illustrating changes in the state of the inflatable structure according to the embodiment of the present invention, showing a state where it is about to finish deployment.
Figure 16:
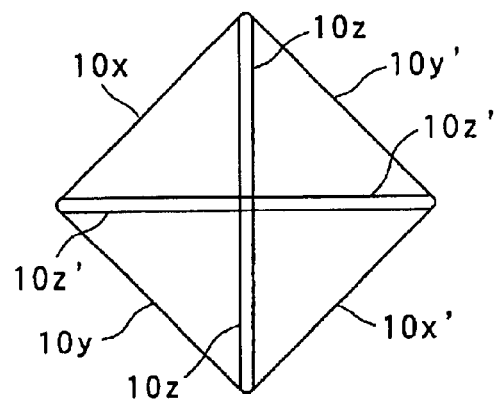
FIG. 16 is a planar perspective view of the inflatable structure according to the embodiment of the present invention in the folded state.
Figure 17:
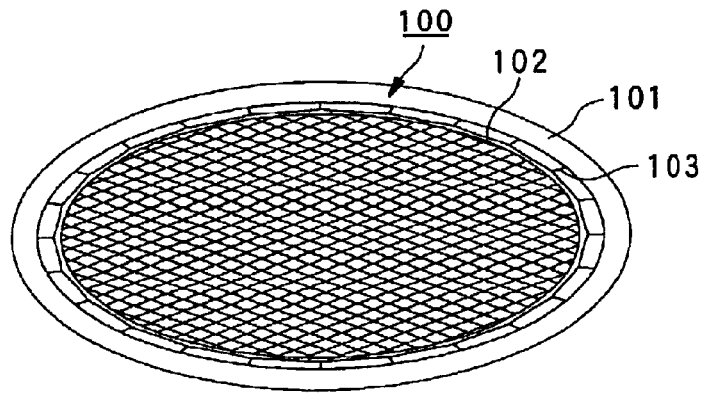
FIG. 17 is a perspective view of a typical example of an inflatable structure.
Figure 18:
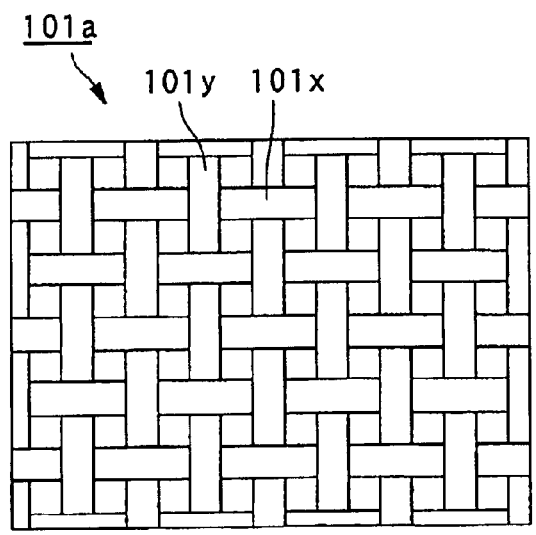
FIG. 18 is a plan view of a biaxial woven fabrics.

FIG. 13 is a developed view explaining a method of folding up the membrane constituting the inflatable structure according to the present embodiment. FIG. 14 is a view illustrating changes of states of the inflatable structure according to the present embodiment from its folded state to a state where it is starting to deploy. FIG. 15 is a view illustrating changes of states showing the inflatable structure according to the present embodiment in a state where it is about to finish its deployment. FIG. 16 is a planar perspective drawing of the inflatable structure according to the present embodiment in its folded up state.

FIG. 13(A) is a developed view corresponding to a cylindrically shaped membrane $10a$. This is used in the inflatable structure applied also in the array antenna and the like described above.

Further, for reference, a developed view of a membrane $10'a$ for a truncated cone-shape tube is also shown in FIG. 13(B). However, the truncated cone-shape tube can be folded and deployed by using the same method as that of the cylindrically shaped tube, so explanations thereof are omitted where appropriate.

FIG. 13 is a developed view in which the cylindrical tube (or the truncated cone-shape tube) is split open along a generatrix line. In other words, the cylindrical membrane may be formed by connecting a generatrix line $101$ and a generatrix line $101'$ (a generatrix line $10'$ and a generatrix line $10'1'$).

In the present embodiment, the structure is folded such that, on the cylindrically shaped membrane, lines which intersect with a plurality of surfaces perpendicular to a cylinder axis will form valley lines.

Looking at the developed view in this regard, the valley lines $10z$ and $10z'$ are perpendicular to the generatrix lines $101$ and $101'$, and are provided in plural number each equally spaced, as shown in FIG. 13(A).

In the case of the truncated cone-shape tube, the valley line $10'z$ is perpendicular to the generatrix lines on the side of the generatrix lines $10'l$ and $10'l'$, but it bends at a point where it crosses a peak line, as shown in FIG. 13(B). Further, toward the vertex of the cone, the distance between neighboring valley lines becomes narrower.

Further, in the present embodiment, the structure is folded up so that valley lines intersect each other alternately in sequence at the cylinder axis portion.

Explanation will be made regarding this point, making reference to FIG. 16.

As shown in the diagram, the valley line $10z$ having the round shape is folded up so that the round part is reduced to a straight line. Then, the valley line $10z$, which neighbors the valley line $10z$ and which similarly has the round shape, is also folded such that its round shape is reduced to a straight line. In this case, the structure is folded such that valley line $10z$ and the valley line $10z'$, which have been transformed into linear lines, intersect each other at the cylinder axis portion as shown in FIG. 16.

Accordingly, then peak lines $10x$, $10x'$, $10y$ and $10y'$ are formed so as to link both end portions of the linear valley line $10z$ and both end portions of the linear valley line $10z'$.

Looking at the developed view shown in FIG. 13(A) in this regard, the neighboring peak lines $10x$ and $10x'$ are formed so as to be mutually parallel and equally spaced, and are provided at 45° slopes with respect to the valley line and with respect to the generatrix lines.

Further, in a similar fashion, the neighboring peak lines $10y$ and $10y'$ are formed parallel to each other at equal intervals, and they are provided at $-45°$ slopes with respect to the valley lines and with respect to the generatrix lines.

Further, the peak lines $10x$ and $10x'$ and the peak lines $10y$ and $10y'$ perpendicularly cross each other at positions where they intersect with the valley lines $10z$ and $10z'$.

The case of the truncated cone-shape tube shown in FIG. 13(B) is substantially similar as well, except that the lines are curved at the crossing points.

FIG. 14(A) shows the state when the structure is folded according to the above-mentioned procedure so that the valley lines alternately intersect each other perpendicularly. Hereinafter, explanation will be made regarding a method of deploying the structure from the folded state and the behavior of the structure during the operation.

As shown in the diagram, a completely folded membrane $10b$ forms a rectangular parallelepiped which appears as having a square shape as viewed from above. In other words, it appears as though a plurality of square membranes were stacked on top of each other.

When this is filled with the gas, first, the membrane $10c$ is deployed in such a way that the stacked square membranes become spaced apart from each other, as shown in FIG. 14(B).

When the gas is filled in further, a membrane $10d$ transforms into the bellows-like configuration as shown in FIG. 15(A).

Then, as more of the gas is filled in, the structure is restored as the original cylindrically shape membrane $10$ as shown in FIG. 15(B).

As described above, if the folding method according to the present embodiment is employed, the following advantages are obtained.

First, since the intersection of the valley lines is on the cylinder axis, the channel for the gas can be secured so as to extend through the cylinder axis even when the structure is completely folded up.

Also, since it is not necessary to create folds at portions other than the valley lines and peak line which are determined in advance, it is possible to fold the structure without any wrinkles whatsoever.

Further, since the shape of the structure when it is folded itself has a spring property that allows its deployment along the cylinder axis, the inflatable structure can readily return to an inflated state.

According to the above, by introducing the gas, the gas can be made to spread throughout the entire structure in a short amount of time. Therefore, the speed at which the structure deploys is easily controlled, and inflation errors caused by the gas not spreading throughout the structure can be prevented. As such, near 100% reproducibility can be anticipated.

Further, since the structure is deployed regularly and uniformly, the behavior of the structure as it unfolds can be predicted.

Further, since the folds in the structure are simple, the folding operation and the storage operation can be performed easily; in particular, storage efficiency along the lengthwise direction of the structure is high. Further, since there are few folds, damage to the airtight layer and the rigidizing layer, which constitute the membrane, can be prevented to the utmost, and creases are unlikely to form.

Note that, the folding method described above may be adapted to anything that is truncated tube-shape; and in addition to anything that is cylinder-shape or truncated cone-shape, the method may be applied to anything that is ring-shape.

INDUSTRIAL APPLICABILITY

As explained above, the inflatable structure according to the present invention achieves a light mass and a high degree of precision, and can be adapted to a demand for increased size.

Further, an array antenna provided with the inflatable structure according to the present invention achieves a light mass and a high degree of precision, and can be adapted to a demand for increased size.

Further, in accordance with a method of deploying the inflatable structure according to the present invention, the reproducibility is excellent.

What is claimed is:

1. An inflatable structure characterized by comprising a multi-layer structure membrane, said multi-layer structure membrane having: an airtight layer for forming an airtight space inside thereof; and a rigidizing layer that is formed with a triaxial woven fabrics of reinforcing fibers and cures after being deployed.

2. An inflatable structure according to claim 1, characterized in that a long shelf life prepreg resin is used as a matrix resin for the rigidizing layer.

3. An inflatable structure according to claim 1 or 2, characterized in that the multi-layer structure membrane has a protective layer for protecting the rigidizing layer, on an outer side of the rigidizing layer.

4. An inflatable structure according to claim 3, characterized in that when the inflatable structure is deployed, the airtight layer exhibits a rate of deformation along its direction of deployment which is greater than a rate of deformation of the protective layer along its direction of deployment.

5. An inflatable structure according to claim 3 or 4, characterized in that the protective layer is provided with a gas escape hole.

6. An inflatable structure according to anyone of claims 1 to 5, characterized by comprising: a plurality of the multi-layer structure membranes formed in cylindrical shapes; and ring-shape rigid connecting members for linking the plurality of the multi-layer structure membranes.

7. An inflatable structure according to claim 6, characterized in that when the inflatable structure is stored, the rigid connecting members function as storage portions for storing the multi-layer structure membranes.

8. An inflatable structure according to claim 6 or 7, characterized in that the rigid connecting members are constructed such that they can be coupled to each other when the inflatable structure is stored.

9. An array antenna provided with the inflatable structure comprising:

the inflatable structure as set forth in any one of claims 1 to 8;

a plurality of membrane members which are extended into a flat planar shape by deployment of the inflatable structure; and a plurality of conductive non-woven fabrics serving as radiatied element, a conductive membrane serving as a grounding surface, and a microstrip line for supplying electricity to the conductive non-woven fabrics, which are each formed onto anyone of the plurality of membrane members, characterized in that the membrane members are composed of triaxial woven fabrics.

10. An array antenna provided with an inflatable structure according to claim 9, comprising two membrane members including a first membrane member and a second membrane member which are arranged in parallel, characterized in that:

the plurality of conductive non-woven fabrics are formed on a surface on an outer side of the first membrane member; the conductive membrane is formed on a surface on an inner side of the second membrane member; and the microstrip line is formed on a surface on an outer side of the second membrane member.

11. An array antenna provided with an inflatable structure according claim 9, comprising three membrane members including a first membrane member, a second membrane member and a third membrane member that are each arranged in sequence and in parallel, characterized in that:

the plurality of conductive non-woven fabrics are formed on a surface on an outer side of the first membrane member;

the conductive membrane is formed on a surface of the second membrane member facing the first membrane member; and the microstrip line is formed on a surface on an outer side of the third membrane member.

12. An array antenna provided with an inflatable structure according claim 9, comprising two membrane members including a first membrane member and a second membrane member that are arranged in parallel, characterized in that: the plurality of conductive non-woven fabrics are formed on a surface on an outer side of the first membrane member;

the conductive membrane is formed to a surface on an inner side of the second membrane member; and the microstrip line is formed to a surface on an outer side of the first membrane member.

13. An array antenna provided with an inflatable structure according to anyone of claims 9 to 12, characterized by comprising:

a plurality of linear members provided linked to each of the membrane members, which, when the inflatable structure is deployed, extend the membrane members into flat planar shapes by pulling each of the membrane members in respectively different directions along the flat plane;

a binding member provided slidably with respect to each pair of the plurality of linear members, which allows a degree of freedom with respect to the spacing between each of the linear members when the inflatable structure is not in its deployed state, whereas it determines the spacing between each of the linear members when the inflatable structure is in its deployed state; and a plurality of stoppers which are each fixed in predetermined positions with respect to each of the linear members and regulates the position of the binding member along its slide direction when the inflatable structure is in its deployed state, to thereby fix the relative positions of each of the linear members along the plane surface.

14. A method of deploying an inflatable structure having a cylindrically shaped membrane with a multi-layer structure, the multi-layer structure including an airtight layer that forms an airtight space inside thereof, and a rigidizing layer that is provided outside the airtight layer and is formed of a triaxial woven fabrics of reinforcing fibers, the method characterized by comprising:

folding the cylindrically shaped membranes in advance in such a way that lines on the cylindrically shaped membrane which intersect a plurality of surfaces perpendicularly intersecting the cylinder axis each form a valley line, and neighboring valley lines along the direction of the axis perpendicularly intersect each other alternately at the points on the cylinder axis;

filling gas inside the airtight layer of the folded membrane to make the membrane into the cylindrical shape; and allowing the rigidizing layer to cure in the state where the membrane has the cylindrical shape.

* * * * *